United States Patent
Cox et al.

(10) Patent No.: US 12,535,189 B2
(45) Date of Patent: Jan. 27, 2026

(54) NATURAL GAS LIQUID MODULAR TERMINAL

(71) Applicant: Flashpoint Energy Partners, LLC, Tulsa, OK (US)

(72) Inventors: Christopher B. Cox, Tulsa, OK (US); John Baanders, Kearney, MO (US); Ian Baanders, Kearney, MO (US)

(73) Assignee: Flashpoint Energy Partners, LLC, Tulsa, OK (US)

( * ) Notice: Subject to any disclaimer, the term of this patent is extended or adjusted under 35 U.S.C. 154(b) by 0 days.

(21) Appl. No.: 18/825,565

(22) Filed: Sep. 5, 2024

(65) Prior Publication Data

US 2025/0075863 A1 Mar. 6, 2025

Related U.S. Application Data

(60) Provisional application No. 63/536,536, filed on Sep. 5, 2023.

(51) Int. Cl.
*F17D 1/00* (2006.01)
*F17D 5/00* (2006.01)
*F25J 1/00* (2006.01)

(52) U.S. Cl.
CPC ............ *F17D 1/005* (2013.01); *F17D 5/00* (2013.01); *F25J 1/0025* (2013.01);
(Continued)

(58) Field of Classification Search
CPC ........ F17C 2221/033; F17C 2223/0161; F17C 2205/0107; F17C 2265/061;
(Continued)

(56) References Cited

U.S. PATENT DOCUMENTS 4,249,387 A * 2/1981 Crowley ................ F25J 1/0045
 62/48.2
4,511,288 A * 4/1985 Wetmore ............ E02B 17/0021
 405/203

(Continued)

FOREIGN PATENT DOCUMENTS

| CN | 104911589 A | 9/2015 |
| CN | 207635007 | 7/2018 |

(Continued)

OTHER PUBLICATIONS

International Search Report and Written Opinion from Corresponding PCT Patent Application PCT/US24/45365 Mailed Dec. 12, 2024; Korean Intellectual Property Office.

*Primary Examiner* — Atif H Chaudry
(74) *Attorney, Agent, or Firm* — Head, Johnson, Kachigian & Wilkinson, PC

(57) ABSTRACT

A natural gas liquid interconnected large pipe storage facility for natural gas liquid wholesale transfer with a proprietary modular manufacturing pipe interface for vapor recovery to aid in the transfer of liquified petroleum gas on an exceptionally small footprint. The natural gas liquid modular terminal may comprise a lower pipe, an upper pipe located above and running parallel to the lower pipe where the upper pipe is in fluid communication with the lower pipe, one or more bulkheads, one or more compressors, and one or more pumps, where the lower pipe, upper pipe, bulkheads, compressors, and pumps are modular and capable of being assembled onsite according to the needs of a user. The natural gas liquid modular terminal may comprise a vapor diffuser inside of the lower pipe.

11 Claims, 36 Drawing Sheets

(52) U.S. Cl.
CPC *F17C 2205/0107* (2013.01); *F17C 2221/033* (2013.01); *F17C 2223/0161* (2013.01); *F17C 2265/061* (2013.01); *F17C 2270/0173* (2013.01)

(58) Field of Classification Search
CPC ....... F17C 2225/0161; F17C 2270/0173; F25J 1/0025; F17D 1/005; F17D 5/00
See application file for complete search history.

(56) References Cited

U.S. PATENT DOCUMENTS

| | | | |
|---|---|---|---|
| 4,826,354 A | * | 5/1989 | Adorjan ................. F16L 59/21 |
| | | | 405/172 |
| 5,429,268 A | | 7/1995 | Hale et al. |
| 7,874,036 B2 | | 1/2011 | Wong et al. |
| 9,261,236 B2 | | 2/2016 | Gates et al. |
| 11,499,678 B2 | | 11/2022 | Krueger et al. |
| 2012/0090729 A1 | | 4/2012 | Nichini et al. |
| 2019/0352920 A1 | * | 11/2019 | Salyer .................... E04G 5/007 |

FOREIGN PATENT DOCUMENTS

| | | | | |
|---|---|---|---|---|
| CN | 108954007 A | | 12/2018 | |
| CN | 215722559 U | | 2/2022 | |
| CN | 114484281 A | | 5/2022 | |
| EP | 2332881 | | 5/2012 | |
| GB | 864053 | | 3/1961 | |
| KR | 1020190076422 A | | 7/2019 | |
| KR | 20200033377 A | * | 3/2020 | ............ F17C 13/004 |

\* cited by examiner

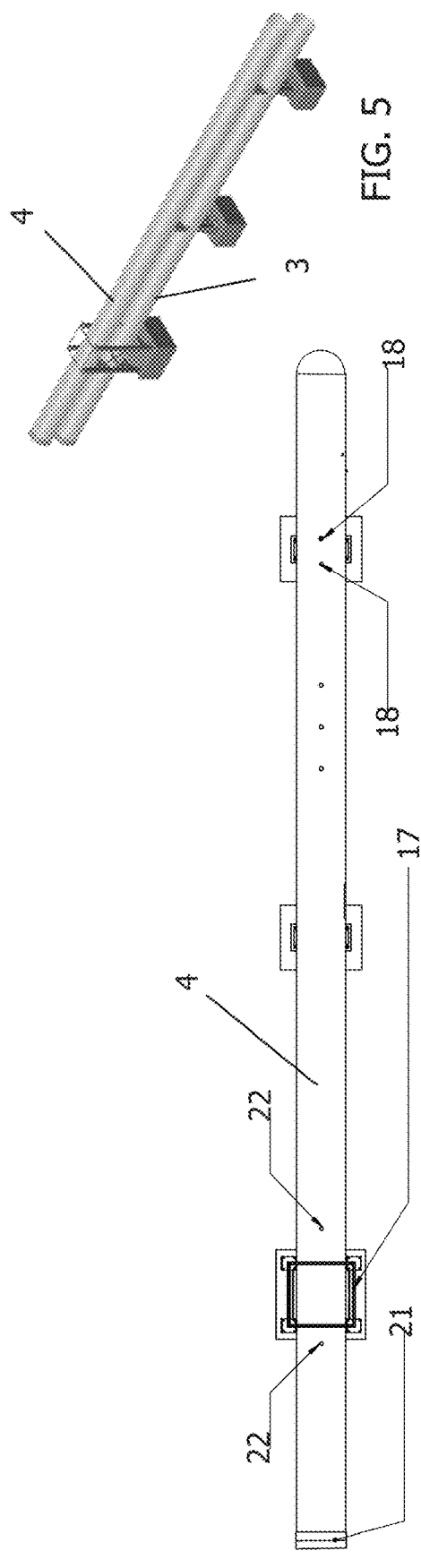
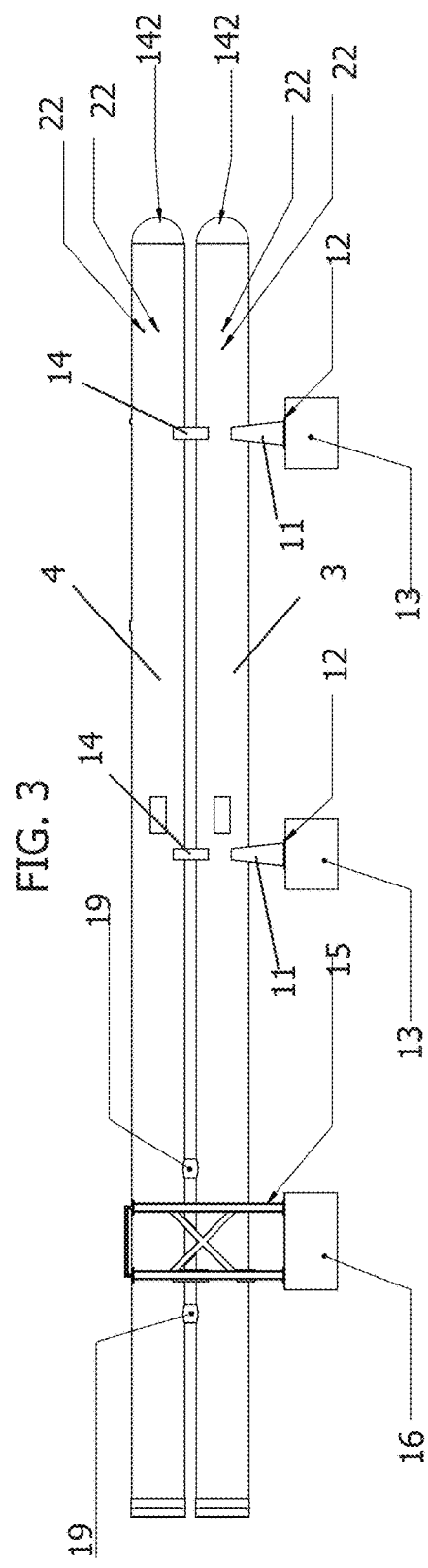
FIG. 3
FIG. 4
FIG. 5

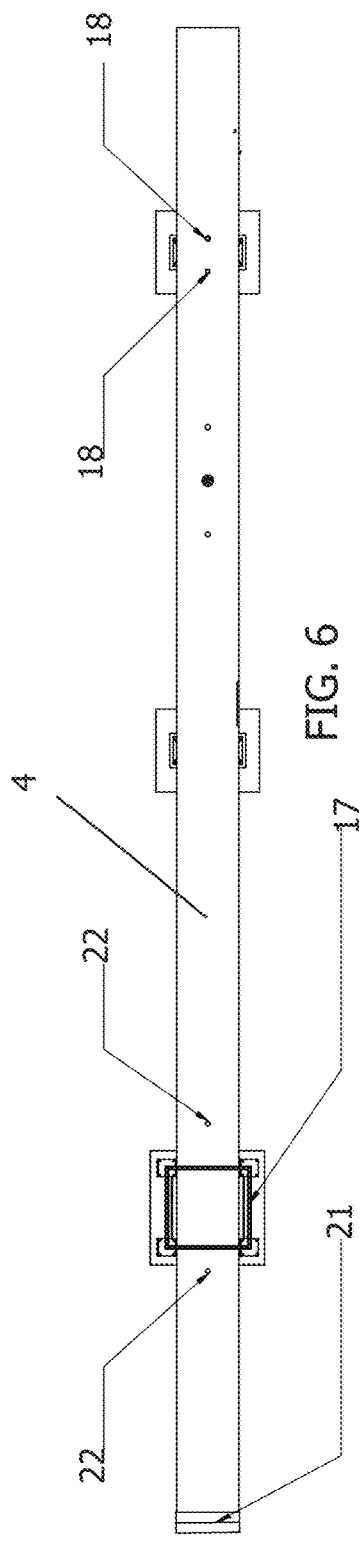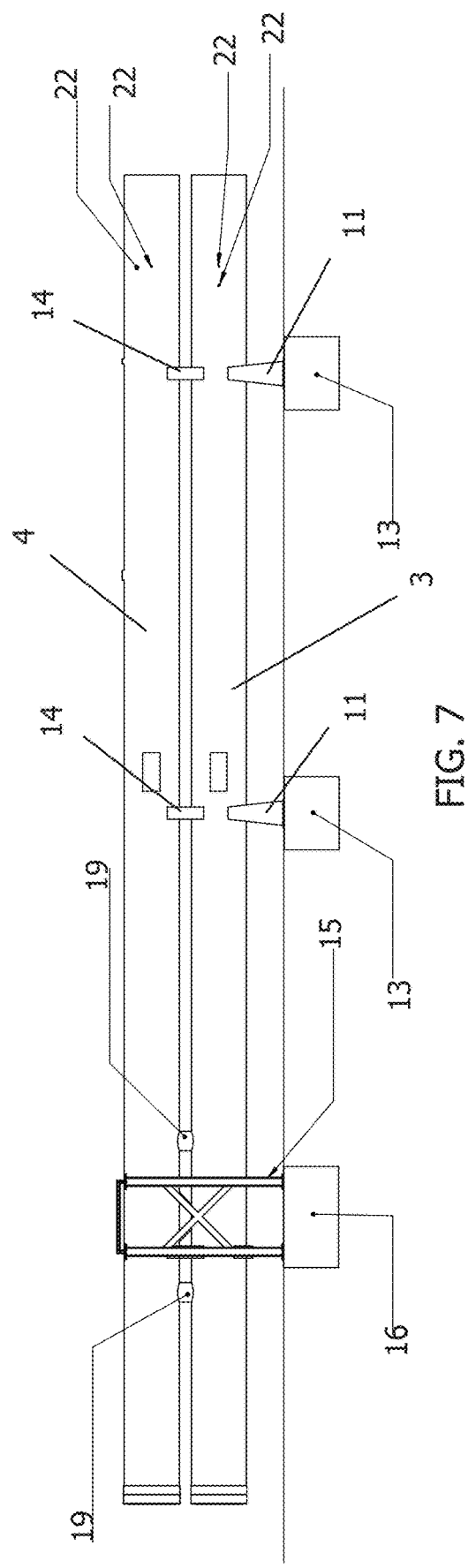

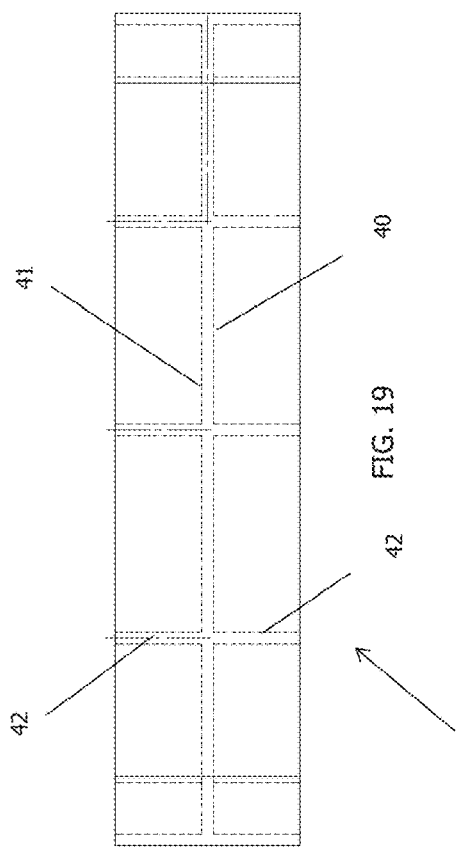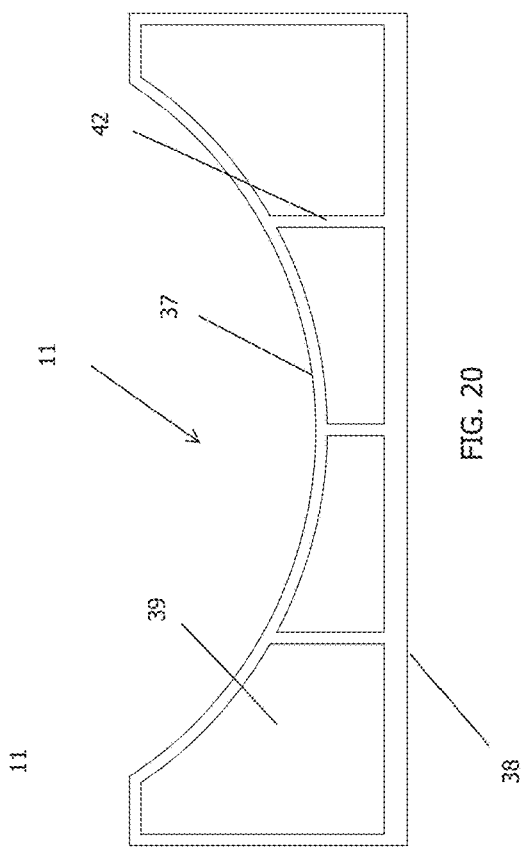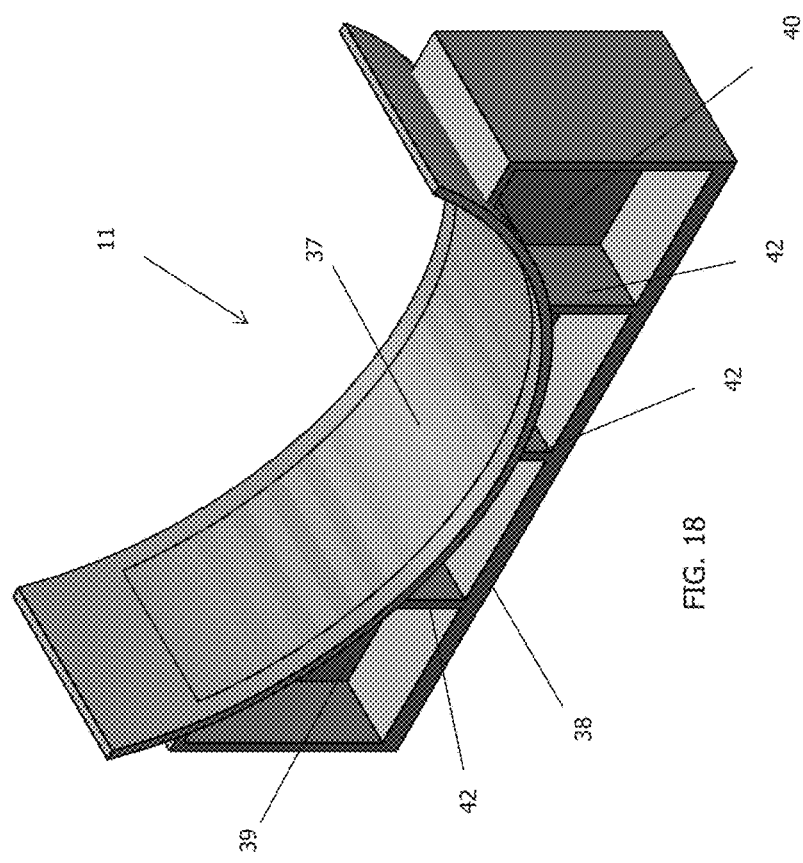

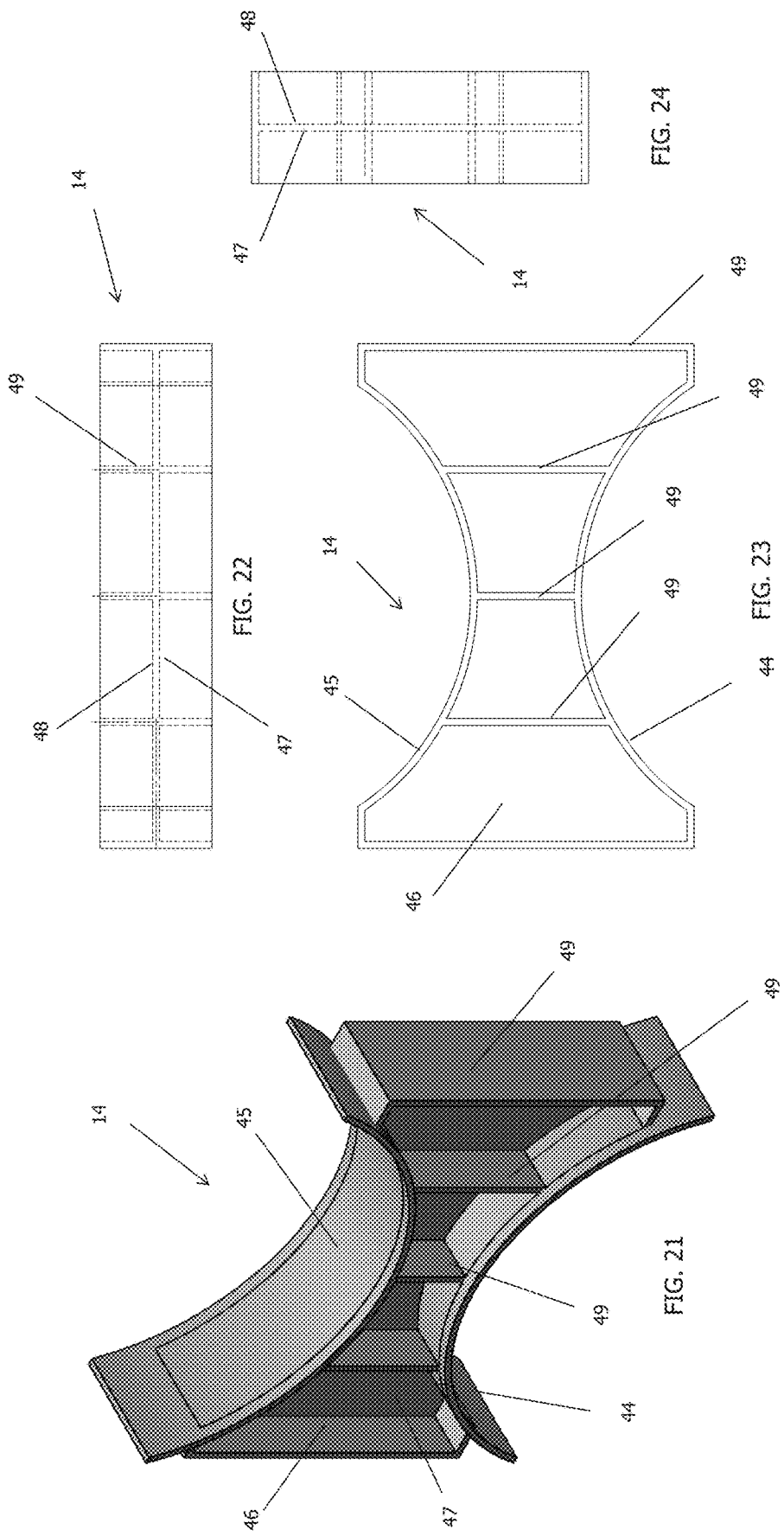

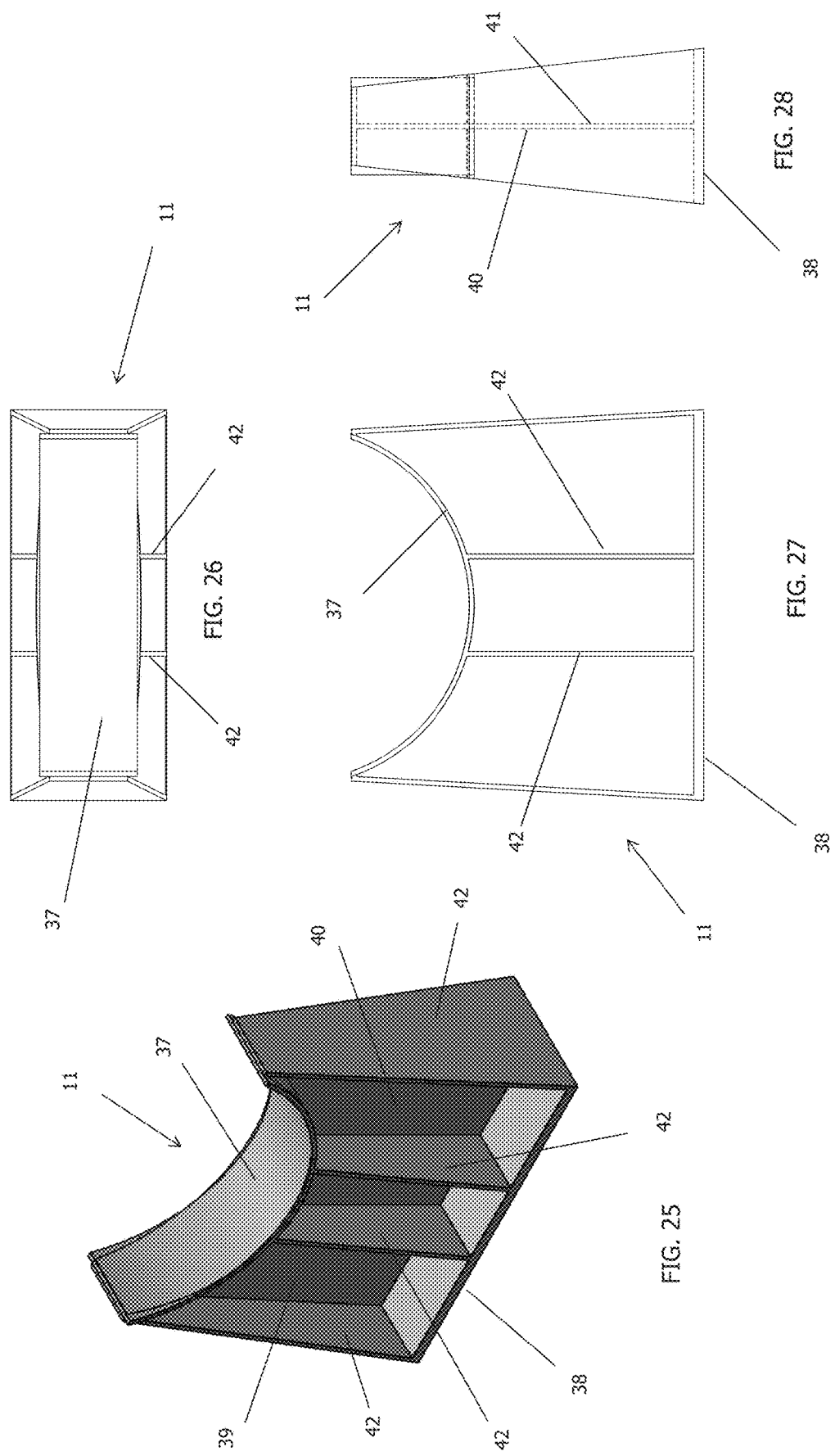

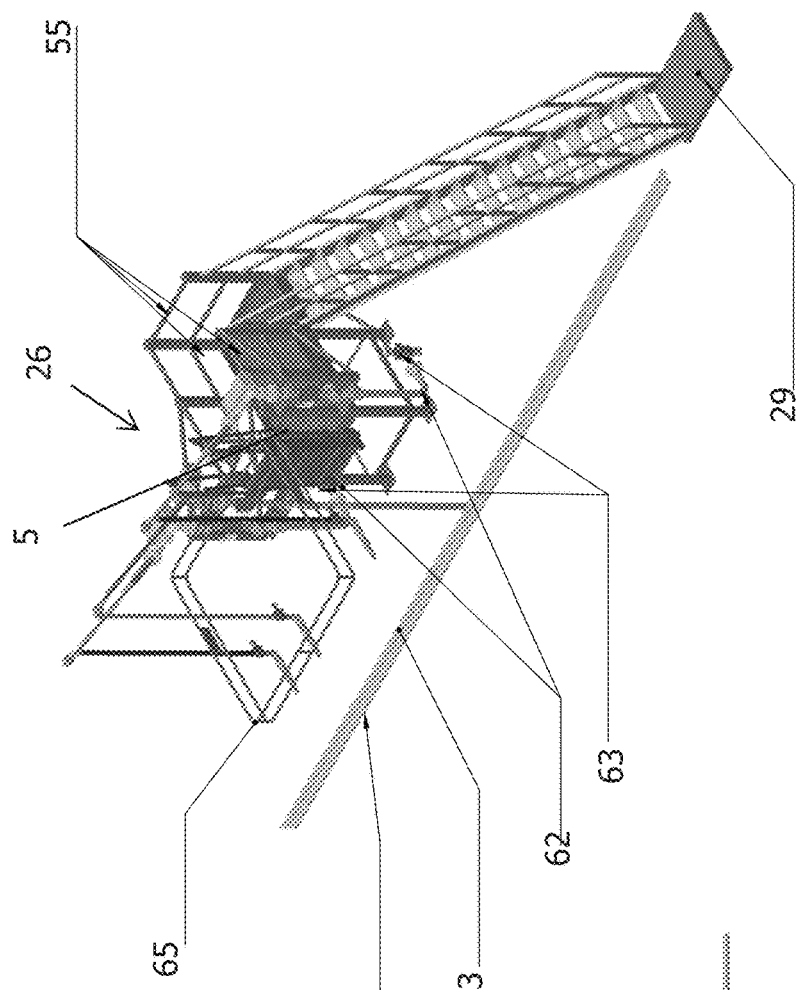
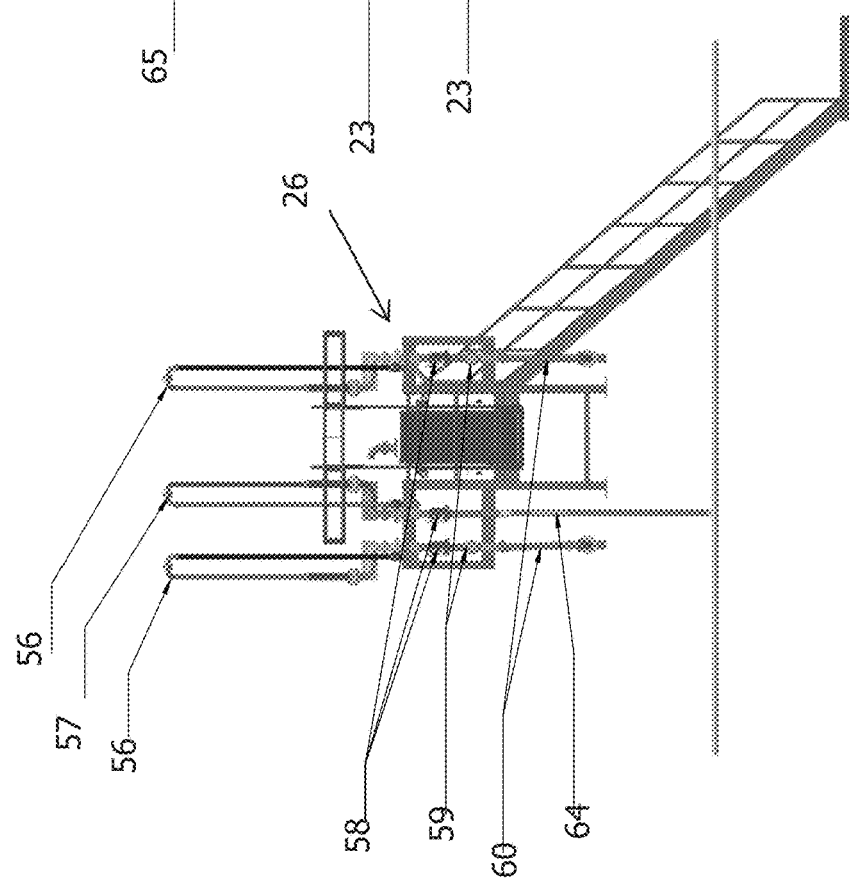
FIG. 36
FIG. 35

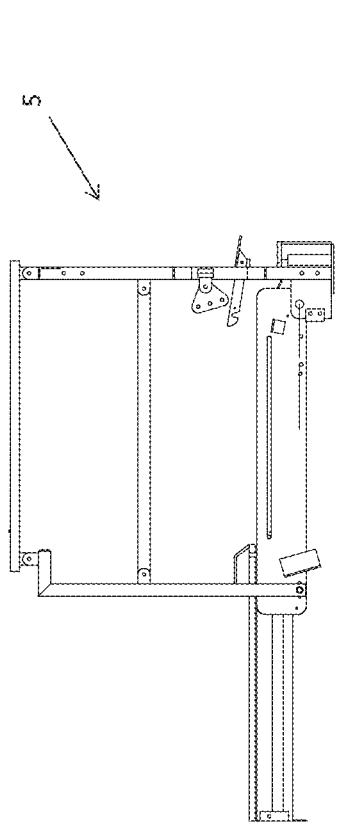
FIG. 43
FIG. 44
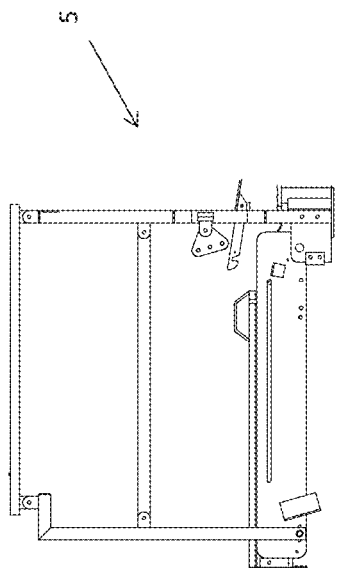
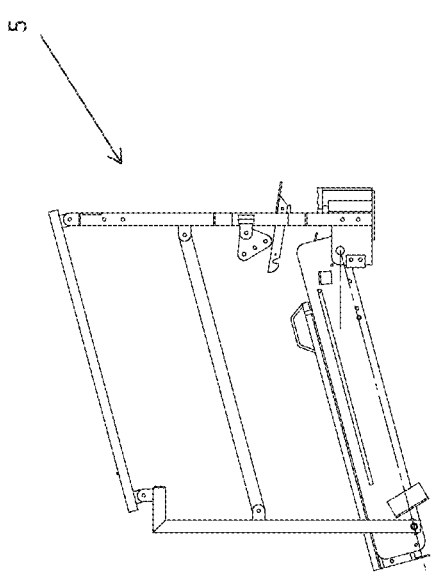
FIG. 45
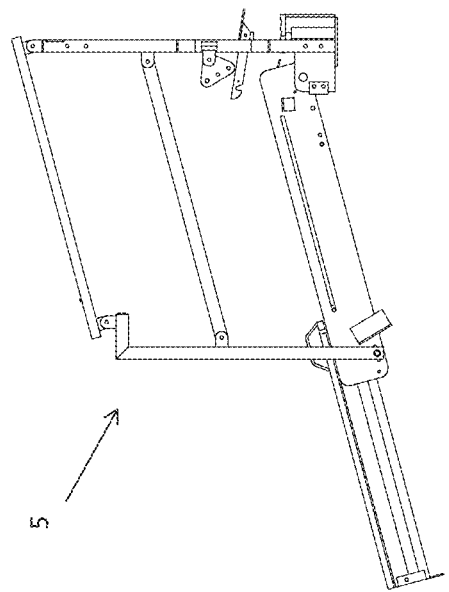
FIG. 46
FIG. 47

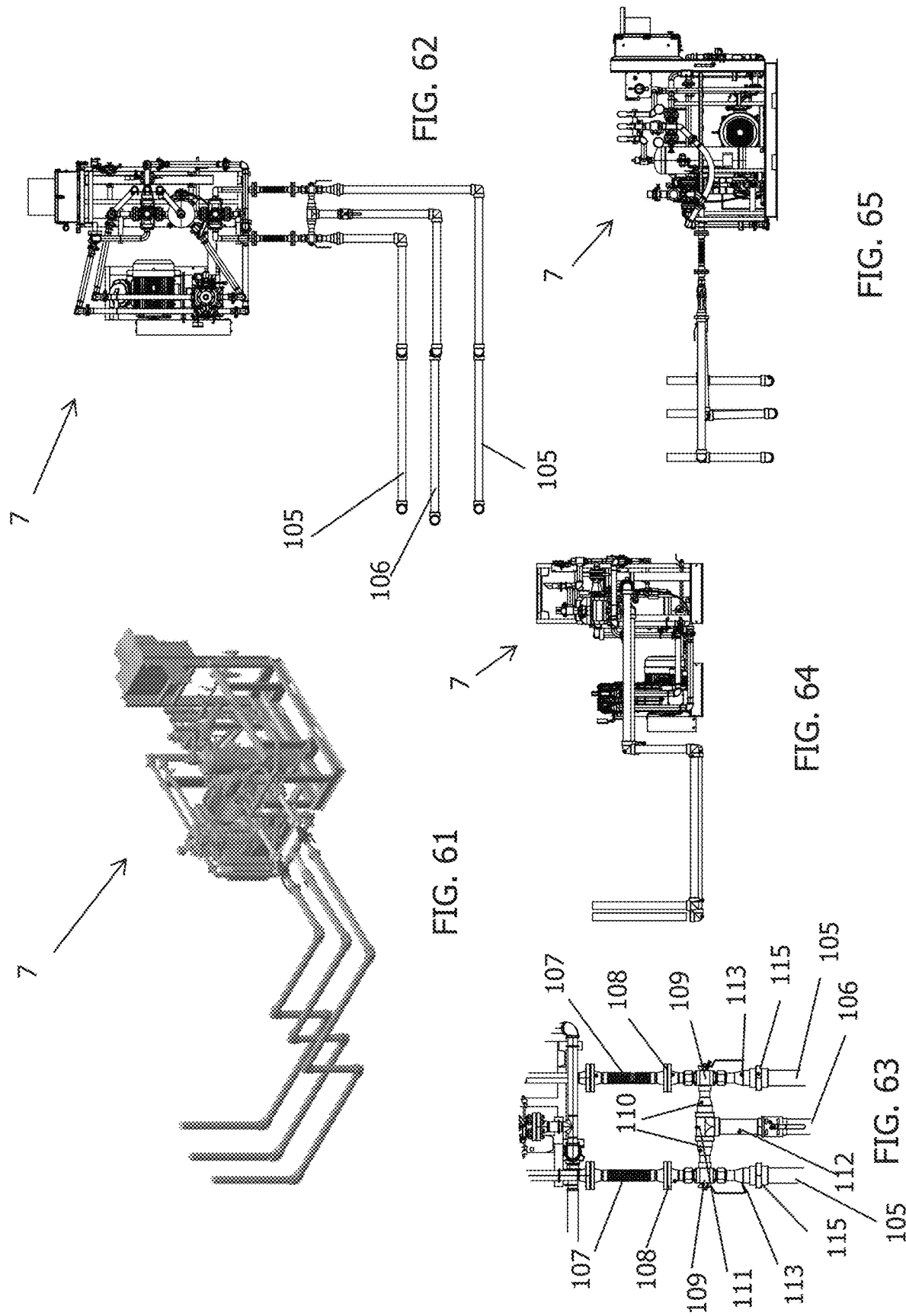

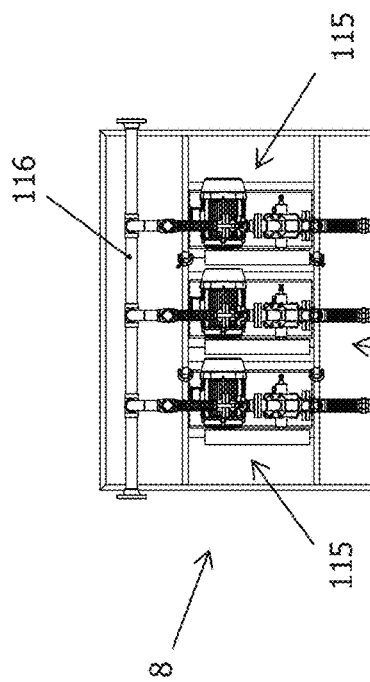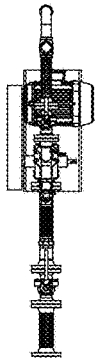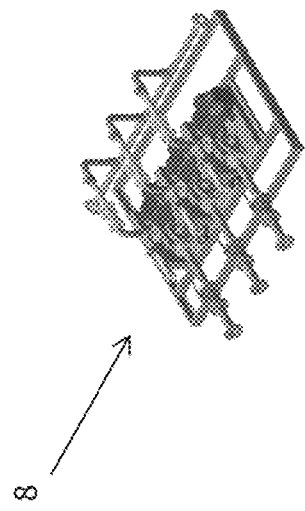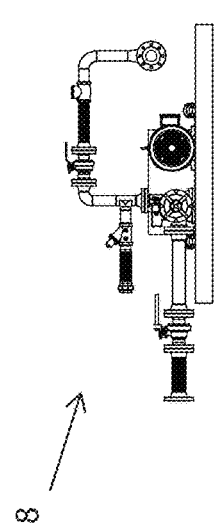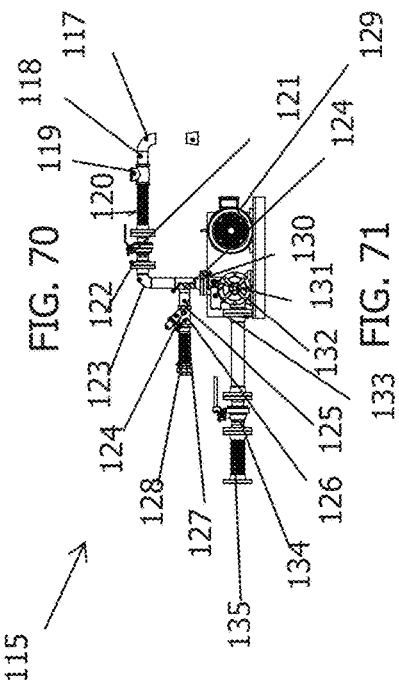

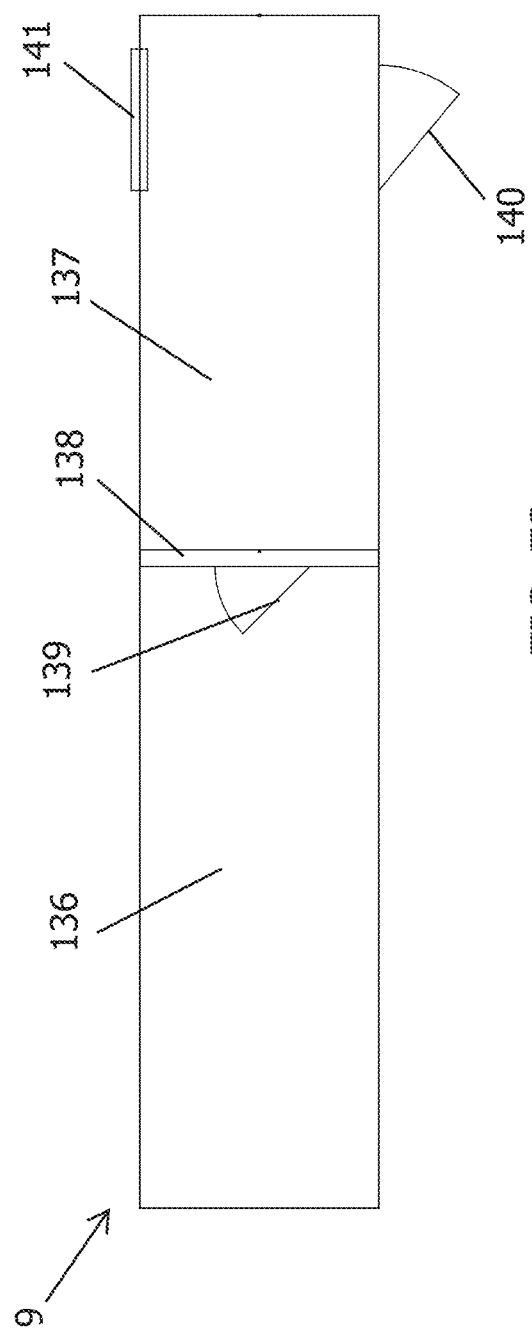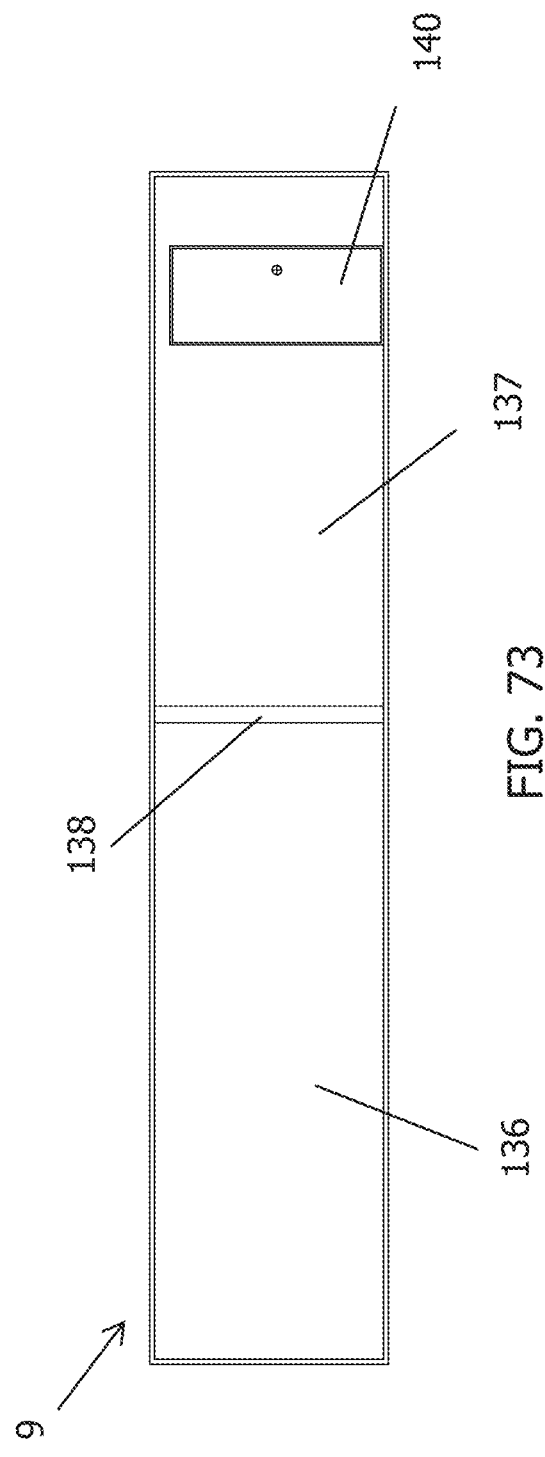
FIG. 72
FIG. 73

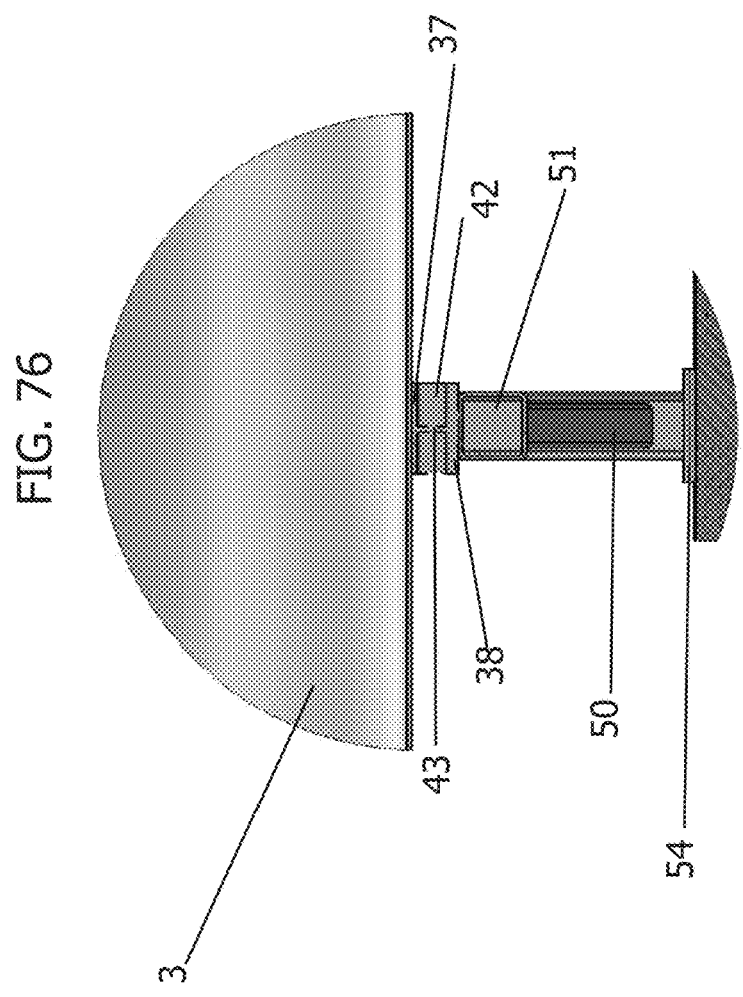
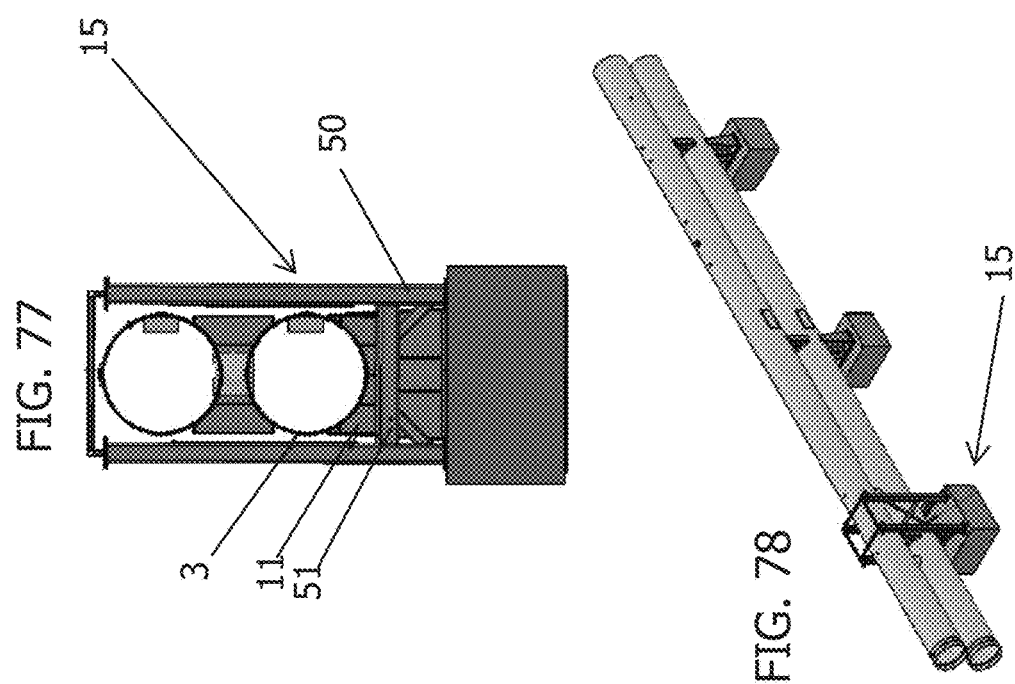
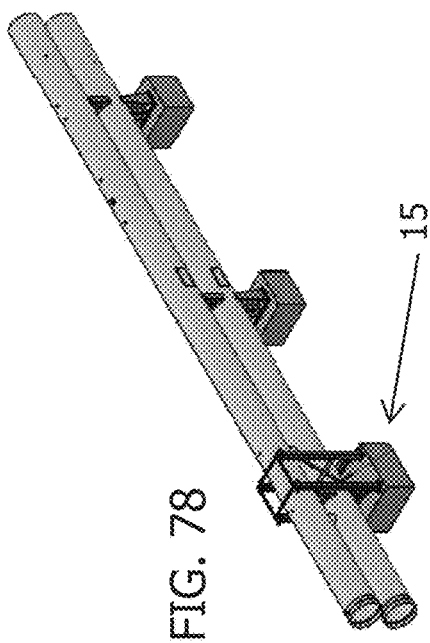
FIG. 76
FIG. 77
FIG. 78

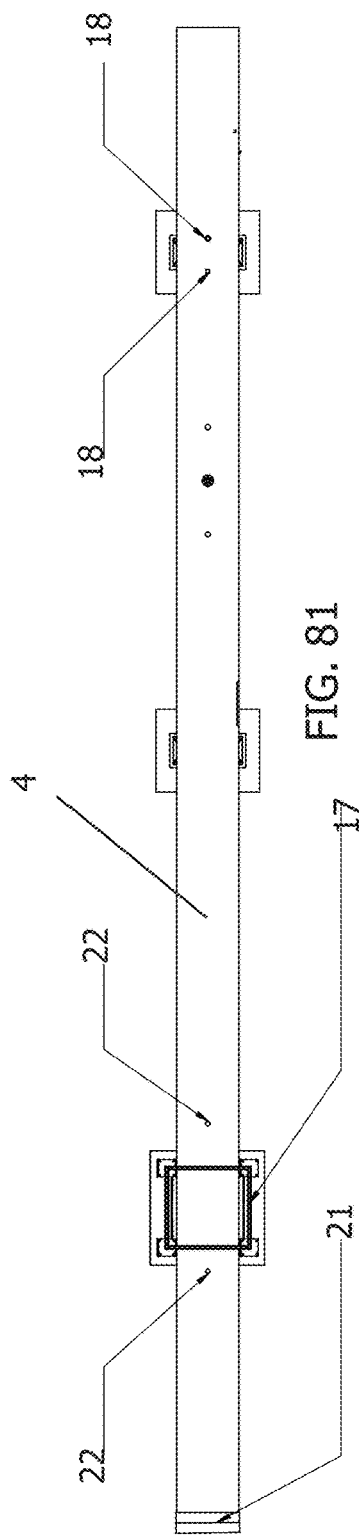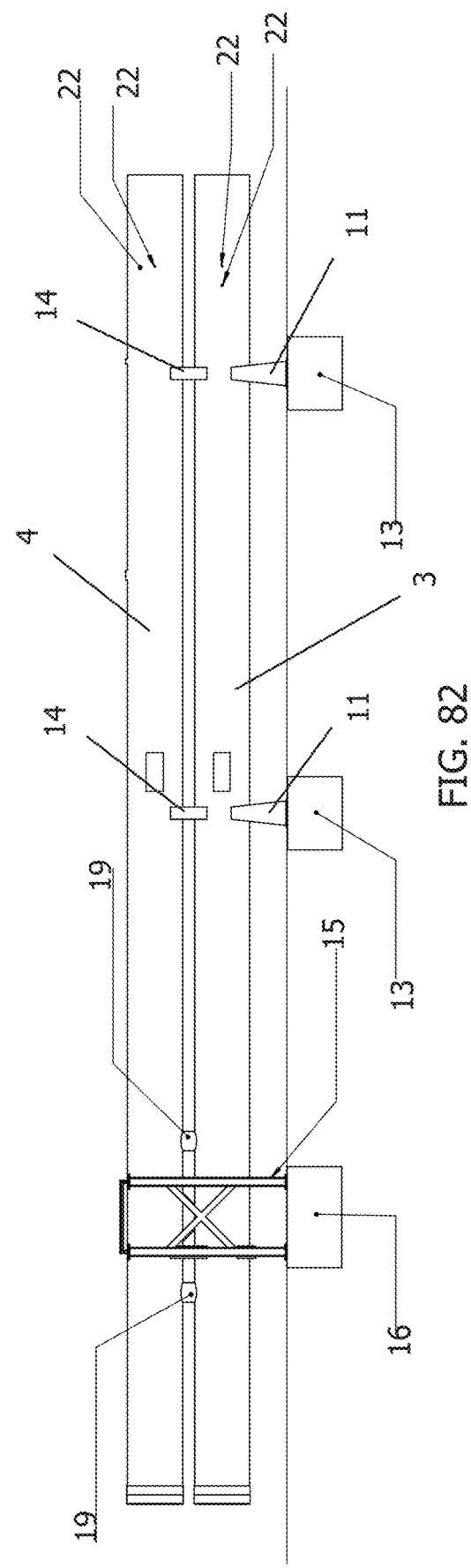
FIG. 81
FIG. 82

NATURAL GAS LIQUID MODULAR TERMINAL

CROSS REFERENCE

This application is based on and claims priority to U.S. Provisional Application No. 63/536,536 filed Sep. 5, 2023.

BACKGROUND OF THE INVENTION

Field of the Invention

This invention relates generally to a natural gas liquid modular terminal and more particularly, but not by way of limitation, to a natural gas liquid interconnected pipe facility for natural gas liquid wholesale transfer with a proprietary modular pipe interface for vapor recovery to aid in the transfer of liquified petroleum gas on an exceptionally small footprint.

Description of the Related Art

Natural gas liquids ("NGLs"), which are hydrocarbons and may include ethane, propane, butane, isobutane, and pentane, are widely used for a variety of purposes. NGLs are sometimes referred to as liquified petroleum gas. When NGLs are transported via railcar, vapor may be unrecoverable during the transfer process. This is dangerous, as NGL vapor is highly flammable and can pose a significant risk if not handled properly. It is also economically undesirable, as it results in lost product. NGL vapor discharged to atmosphere is additionally an environmental risk, as NGLs are fossil fuels and can contribute to greenhouse gas emissions.

Based on the foregoing, it is desirable to provide a terminal design that is focused on the temporary storage and transfer of NGLs while recovering residual vapor.

It is further desirable for the terminal to be modular.

It is further desirable for the terminal to have a small footprint.

SUMMARY OF THE INVENTION

In general, in a first aspect, the invention relates to a natural gas liquid modular terminal comprising a lower pipe, an upper pipe located above and running parallel to the lower pipe and where the upper pipe is in fluid communication with the lower pipe, one or more bulkheads, one or more compressors, and one or more pumps, where the lower pipe, upper pipe, bulkheads, compressors, and pumps are modular and capable of being assembled onsite according to the needs of a user.

The natural gas liquid modular terminal may further comprise one or more of the of the following: one or more rail towers; one or more gangways; and one or more stairways; where the rail towers, gangways, and/or stairways are modular and capable of being assembled onsite according to the needs of the user. The natural gas liquid modular terminal may further comprise a pair of vapor lines.

The natural gas liquid modular terminal may further comprise one or more liquid loading arms in fluid communication with the upper pipe and one or more vapor loading arms in fluid communication with a vapor line that connects to the one or more compressors. The natural gas liquid modular terminal may further comprise a safety cage at least partially surrounding the loading arms.

BRIEF DESCRIPTION OF THE DRAWINGS

FIG. 3 is a top view of a first section of the natural gas liquid modular terminal;

FIG. 4 is a side view of the first section of the natural gas liquid modular terminal;

FIG. 5 is a perspective view of the first section of the natural gas liquid modular terminal;

FIG. 6 is a top view of a second section of the natural gas liquid modular terminal;

FIG. 7 is a side view of the second section of the natural gas liquid modular terminal;

FIG. 18 is a perspective view of the single saddle;

FIG. 19 is a top view of the single saddle;

FIG. 20 is a side view of the single saddle;

FIG. 21 is a perspective view of the double saddle;

FIG. 22 is a top view of the double saddle;

FIG. 23 is a side view of the double saddle;

FIG. 24 is a cross-sectional view of the double saddle;

FIG. 25 is a perspective view of the A-frame saddle;

FIG. 26 is a top view of the A-frame saddle;

FIG. 27 is a side view of the A-frame saddle;

FIG. 28 is a cross-sectional view of the A-frame saddle;

FIG. 35 is a front view of the rail tower top and gateway assembly;

FIG. 36 is a perspective view of the rail tower top and gateway assembly;

FIG. 43 is a side view of the gangway assembly in a horizontal position with the extension in;

FIG. 44 is a side view of the gangway assembly in a horizontal position with the extension out;

FIG. 45 is a side view of the gangway assembly in a 15° decline position with the extension in;

FIG. 46 is a side view of the gangway assembly in a 15° decline position with the extension out;

FIG. 47 is a side view of the gangway assembly in a stored position;

FIG. 61 is a perspective view of the compressor assembly;

FIG. 62 is a top view of the compressor assembly;

FIG. 63 is a top view of the compressor line junction;

FIG. 64 is a front view of the compressor assembly;

FIG. 65 is a side view of the compressor assembly;

FIG. 66 is a perspective view of the pump skid;

FIG. 67 is a top view of the pump skid;

FIG. 68 is a front view of the pump skid;

FIG. 69 is a side view of the pump skid;

FIG. 70 is a top view of the pump;

FIG. 71 is a side view of the pump;

FIG. 72 is a top view of the MCC building; and

FIG. 73 is a side view of the MCC building.

FIG. 76 is a cross-sectional view of the single saddle interface with the rail tower base.

FIG. 77 is a side view of the single saddle interface with the rail tower base.

FIG. 78 is a perspective view of the upper and lower pipes running through the rail tower base.

FIG. 81 is a top view of a second embodiment of a second section of the natural gas liquid modular terminal;

FIG. 82 is a side view of the second embodiment of the second section of the natural gas liquid modular terminal;

Figure 1:
FIG. 1 is top perspective view of the natural gas liquid modular terminal on site.
Figure 2:
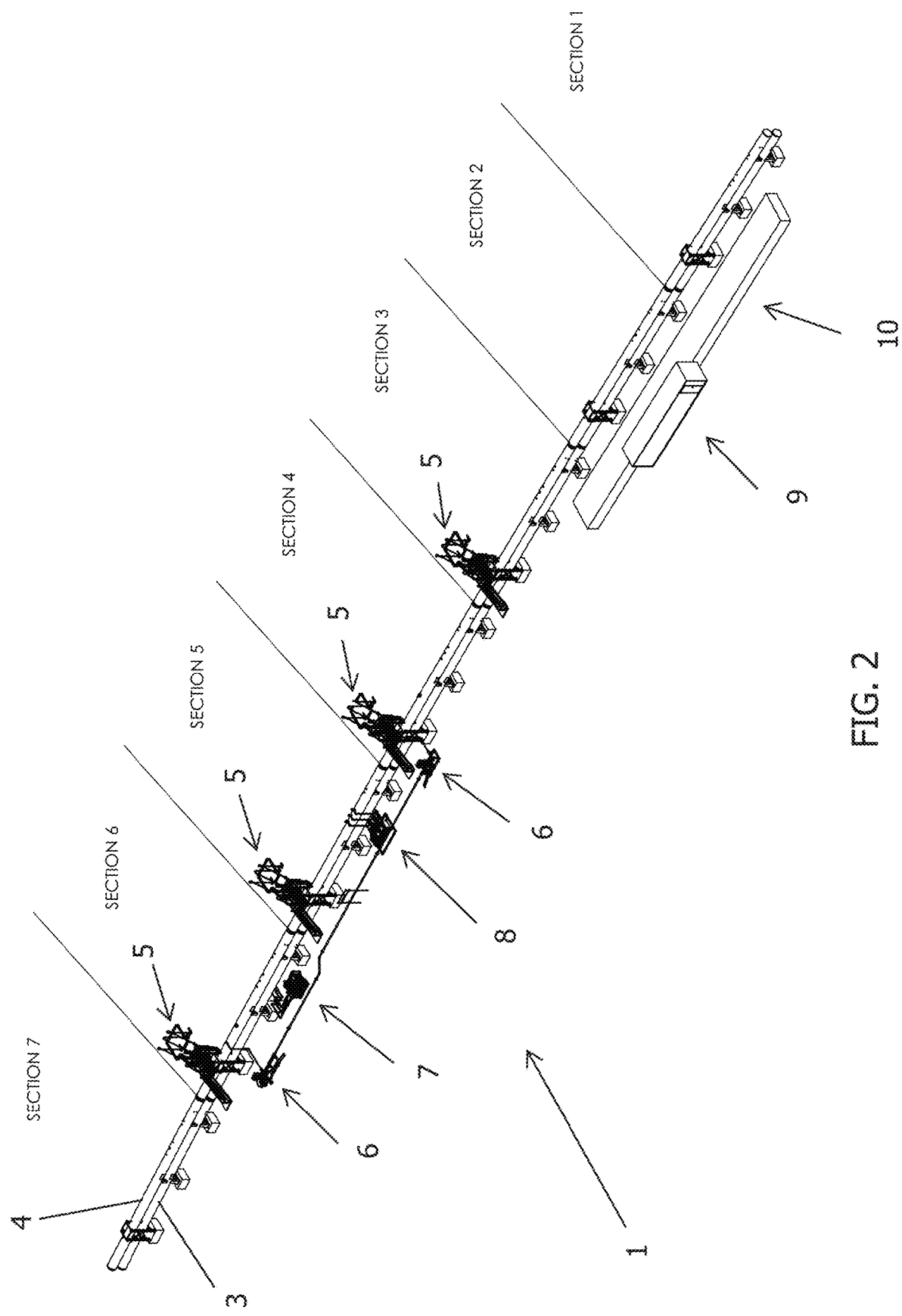
FIG. 2 is a top perspective view of the natural gas liquid modular terminal.
Figure 8:
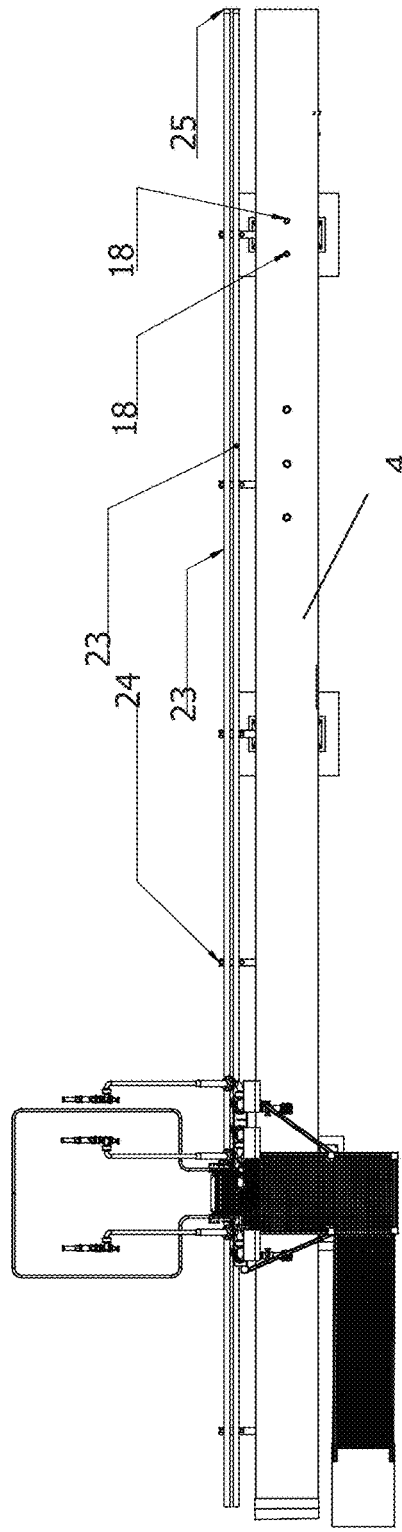
FIG. 8 is a top view of a third section of the natural gas liquid modular terminal.
Figure 9:
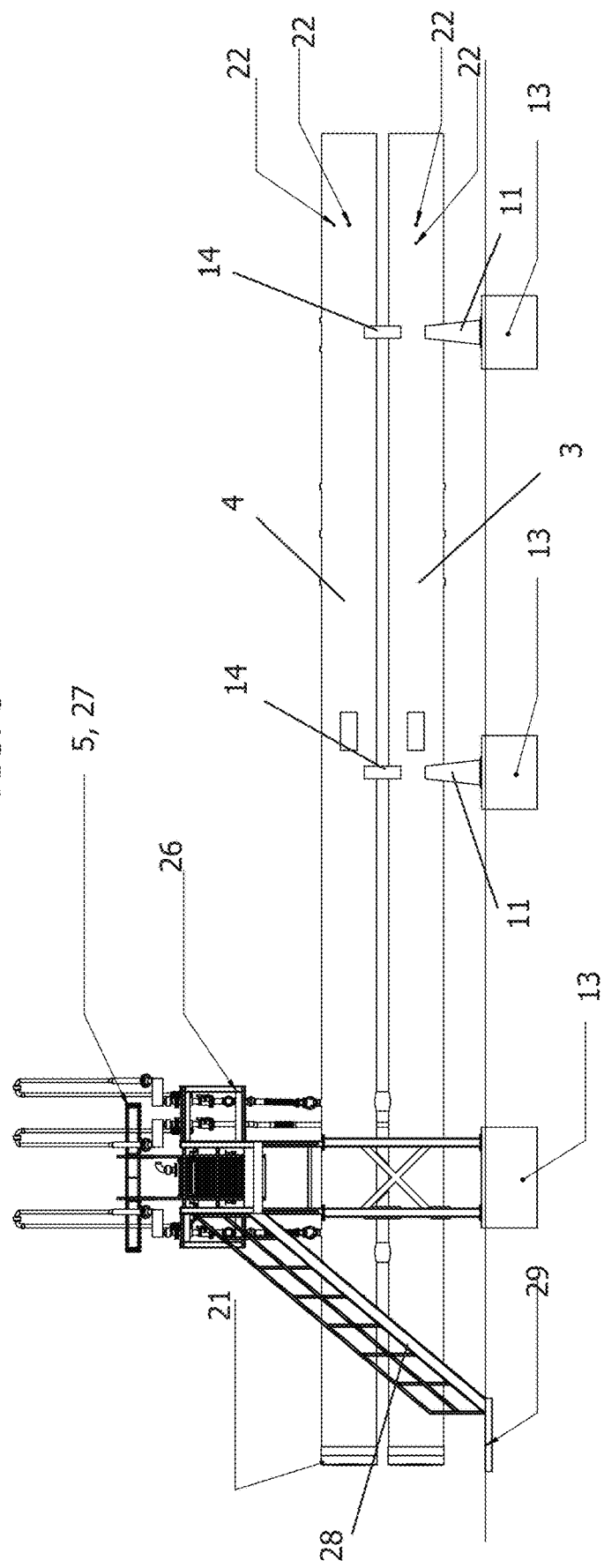
FIG. 9 is a side view of the third section of the natural gas liquid modular terminal.
Figure 10:
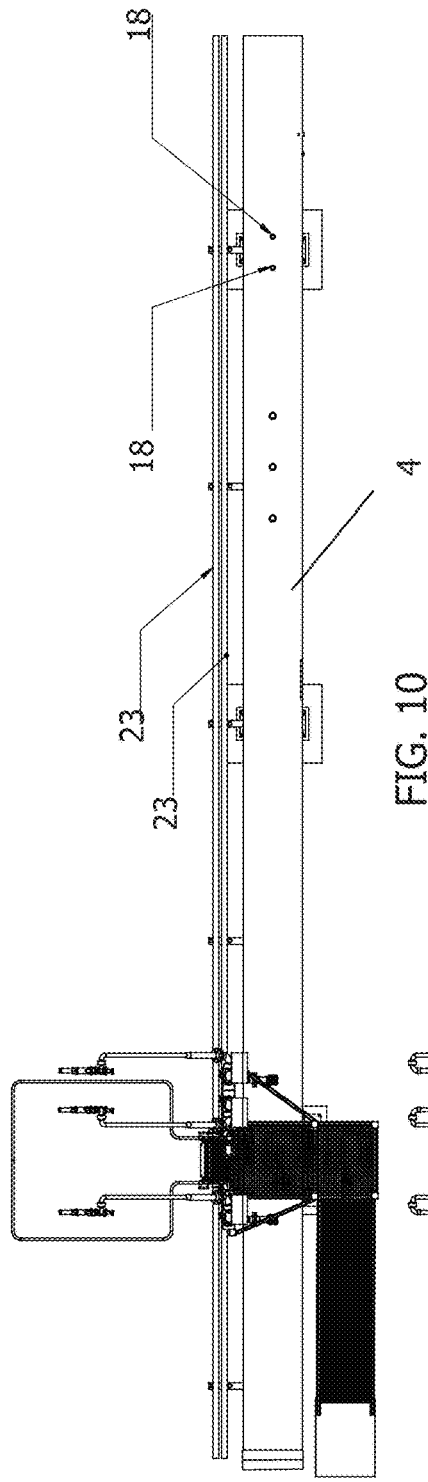
FIG. 10 is a top view of a fourth section of the natural gas liquid modular terminal.
Figure 11:
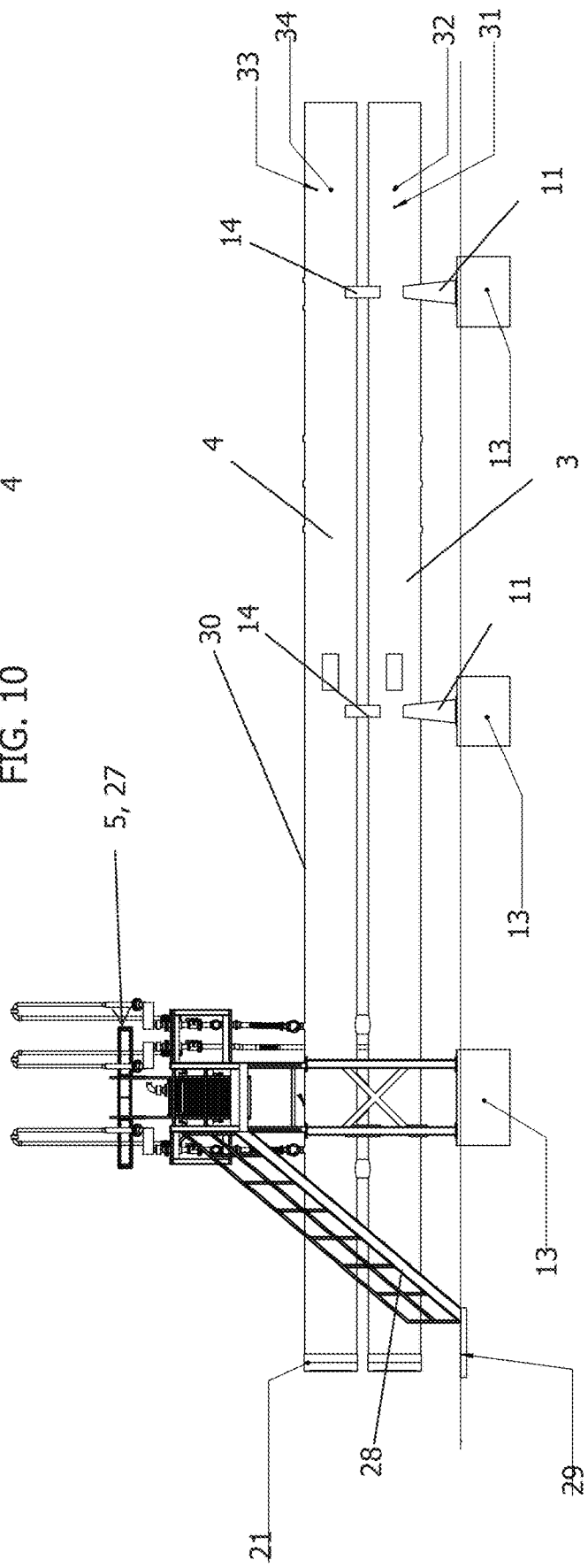
FIG. 11 is a side view of the fourth section of the natural gas liquid modular terminal.
Figure 12:
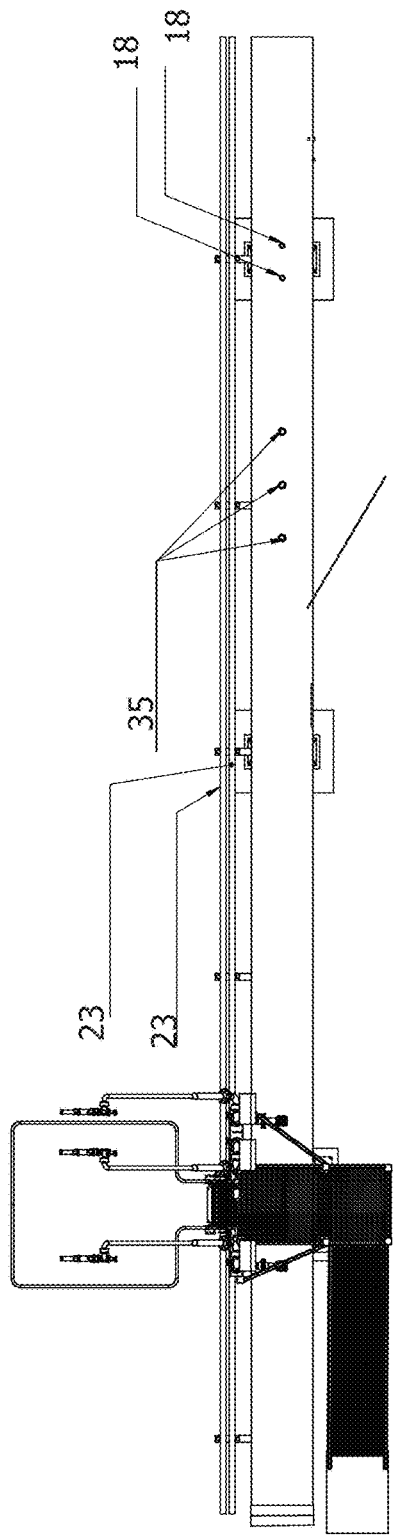
FIG. 12 is a top view of a fifth section of the natural gas liquid modular terminal.
Figure 13:
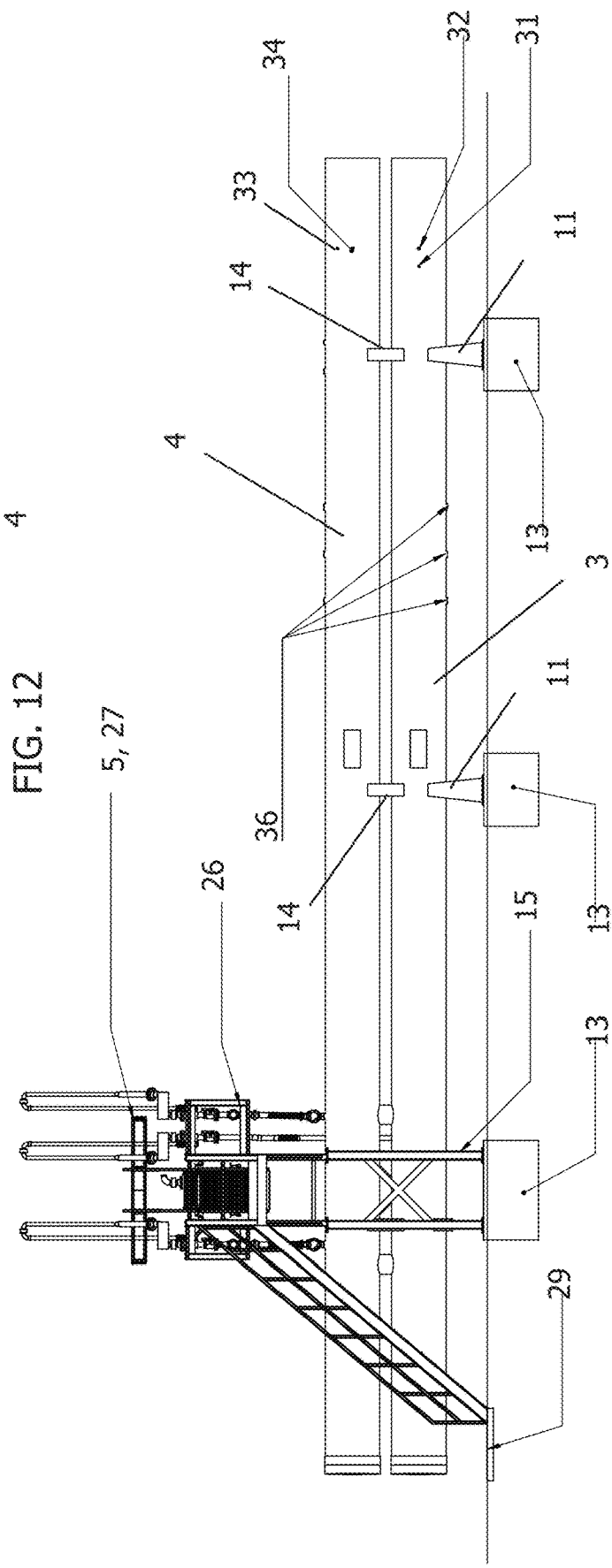
FIG. 13 is a side view of the fifth section of the natural gas liquid modular terminal.
Figure 14:
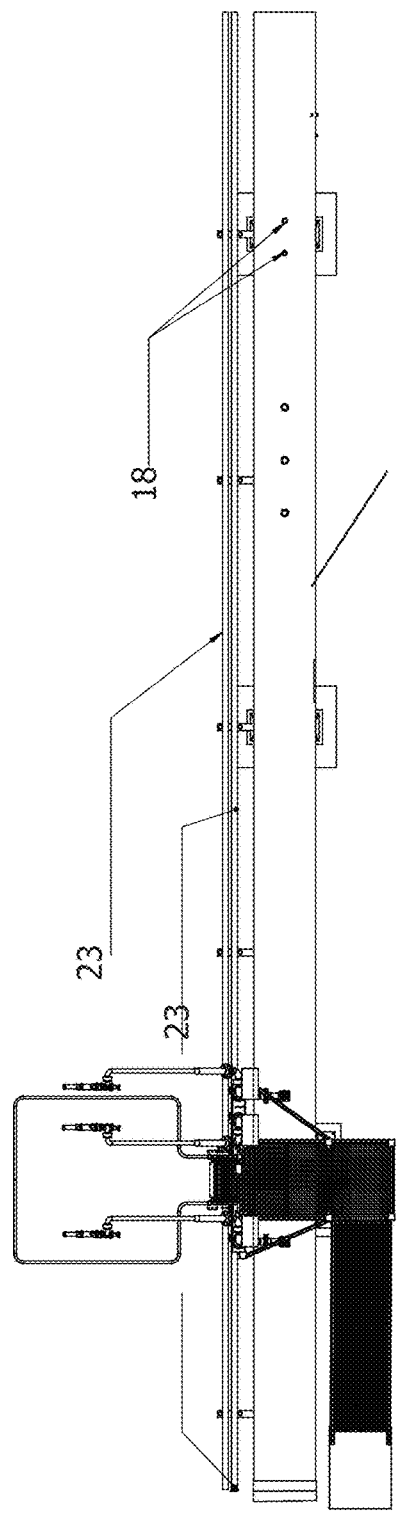
FIG. 14 is a top view of a sixth section of the natural gas liquid modular terminal.
Figure 15:
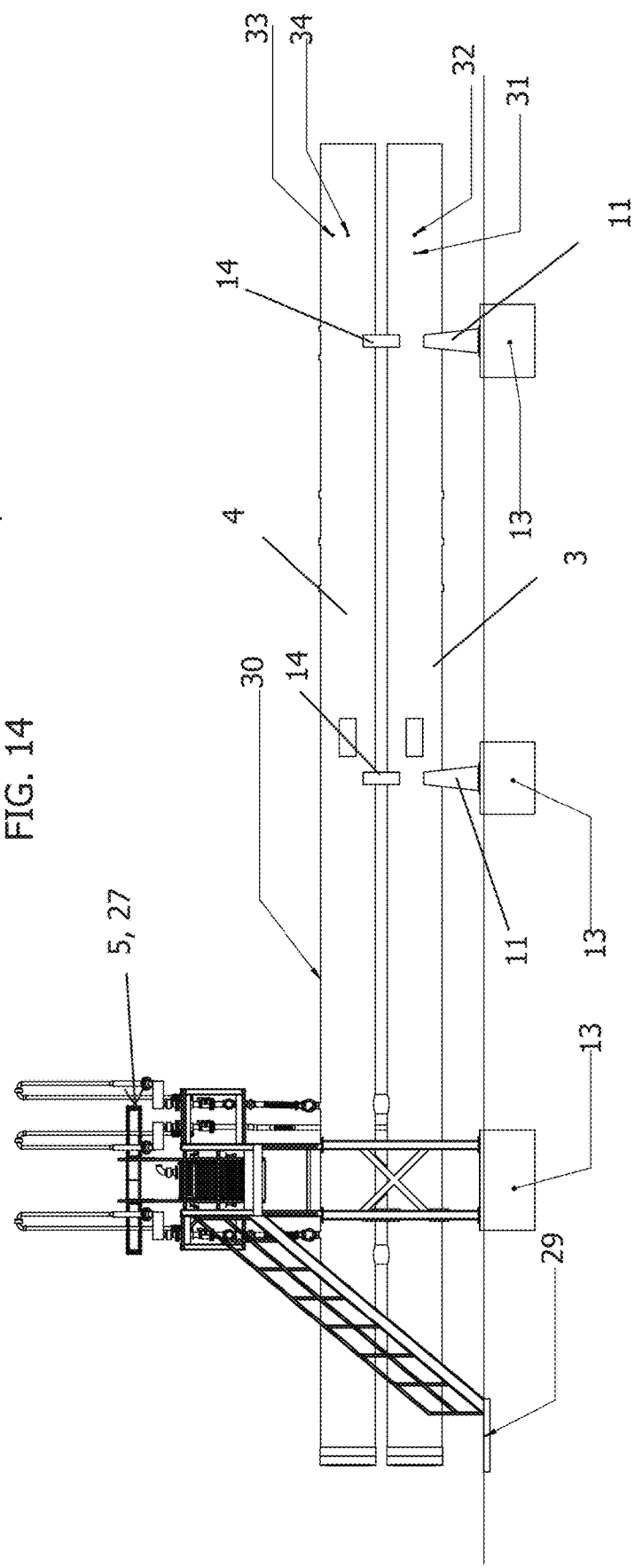
FIG. 15 is a side view of the sixth section of the natural gas liquid modular terminal.
Figure 16:
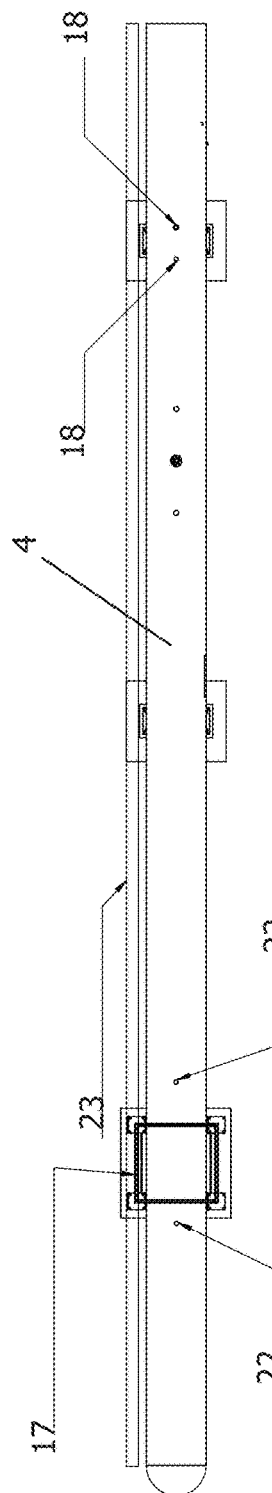
FIG. 16 is a top view of a seventh section of the natural gas liquid modular terminal.
Figure 17:
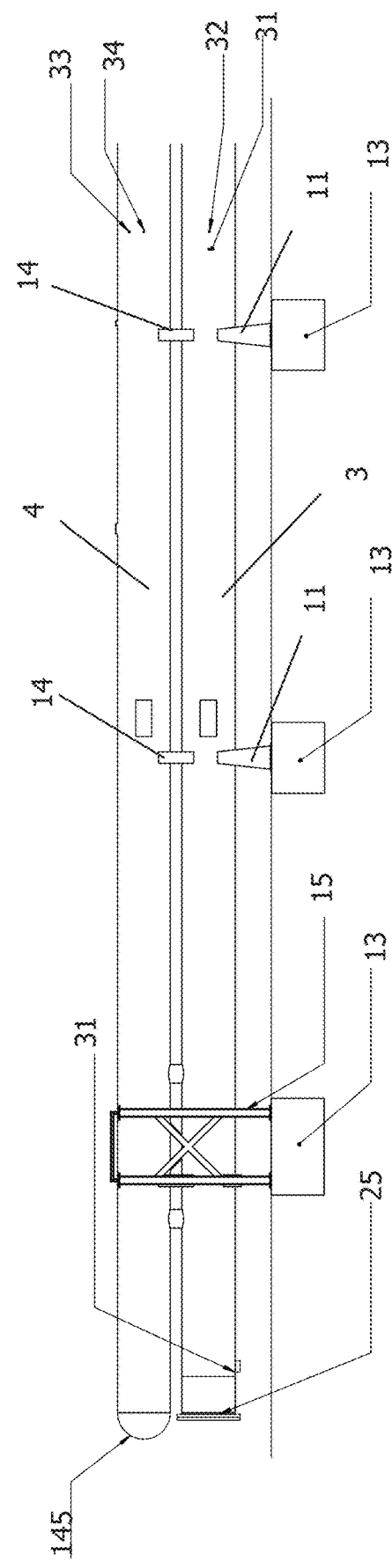
FIG. 17 is a side view of the seventh section of the natural gas liquid modular terminal.
Figure 31:
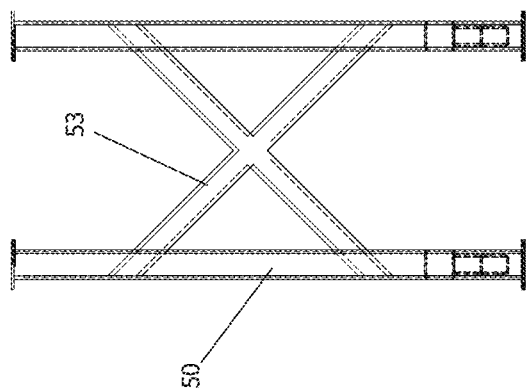
FIG. 31 is a front view of the rail tower bottom.
Figure 30:
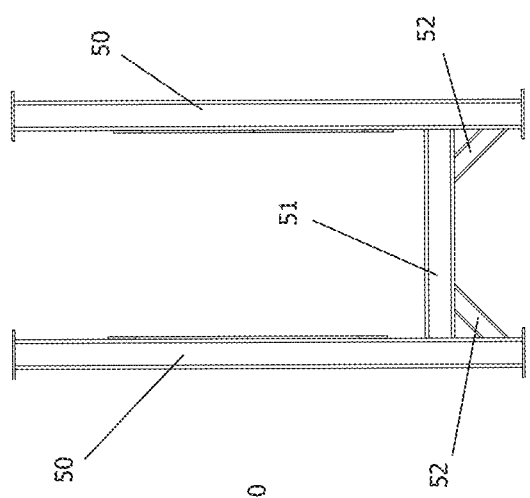
FIG. 30 is a side view of the rail tower bottom.
Figure 32:
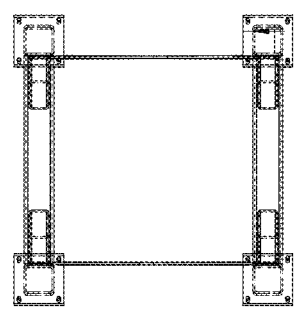
FIG. 32 is a top view of the rail tower bottom.
Figure 29:
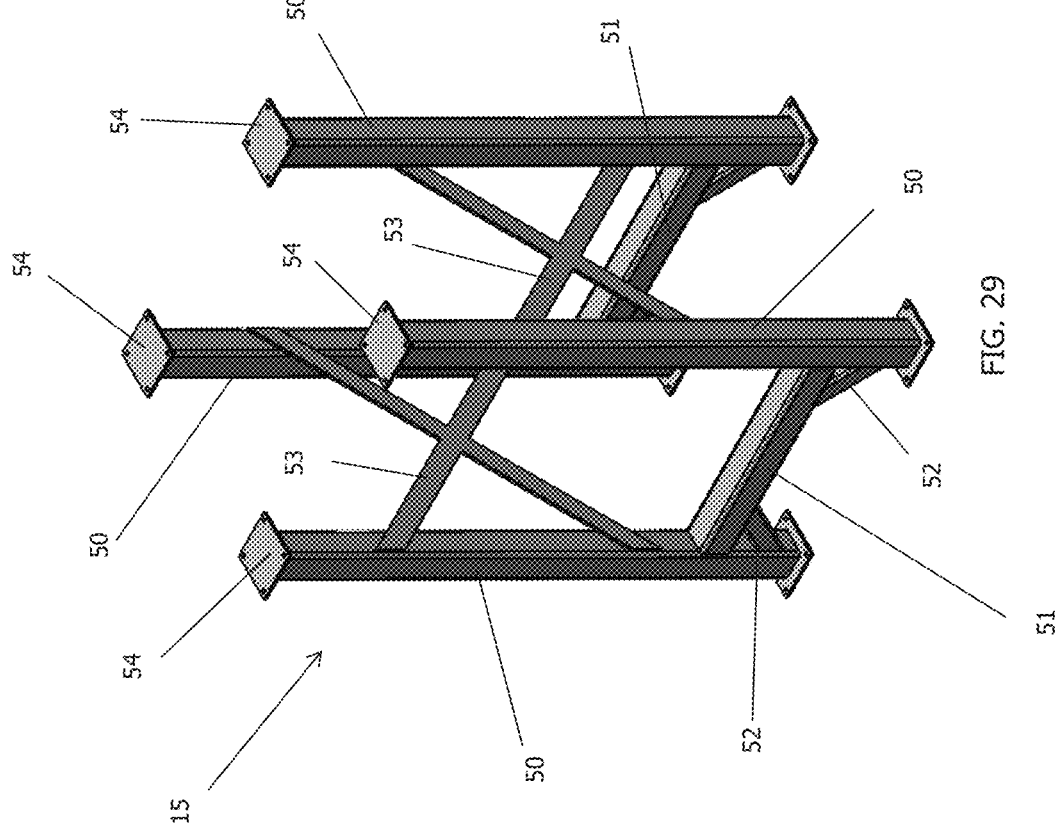
FIG. 29 is a perspective view of the rail tower bottom.
Figure 34:
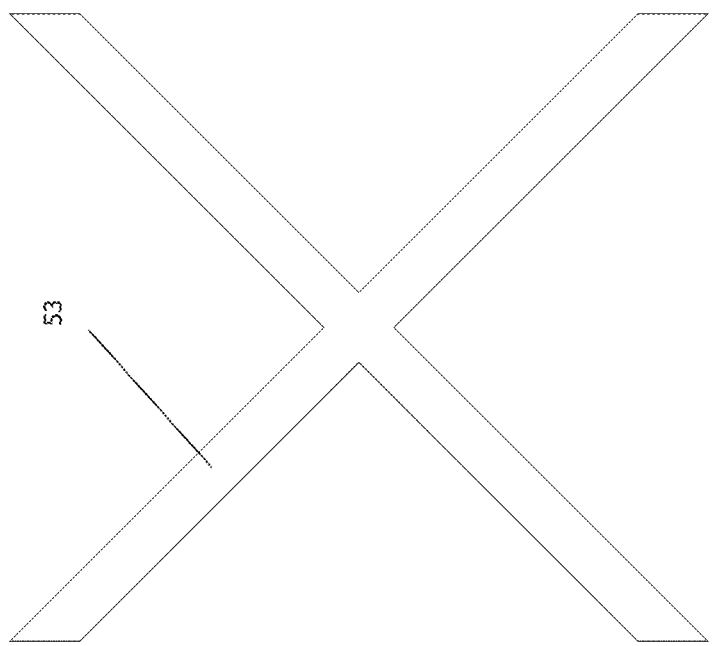
FIG. 34 is a front view of the X-shaped support of the rail tower bottom.
Figure 33:
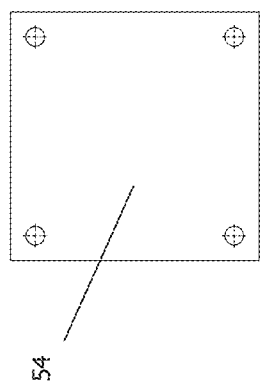
FIG. 33 is a top view of the plate of the rail tower bottom.
Figure 37:
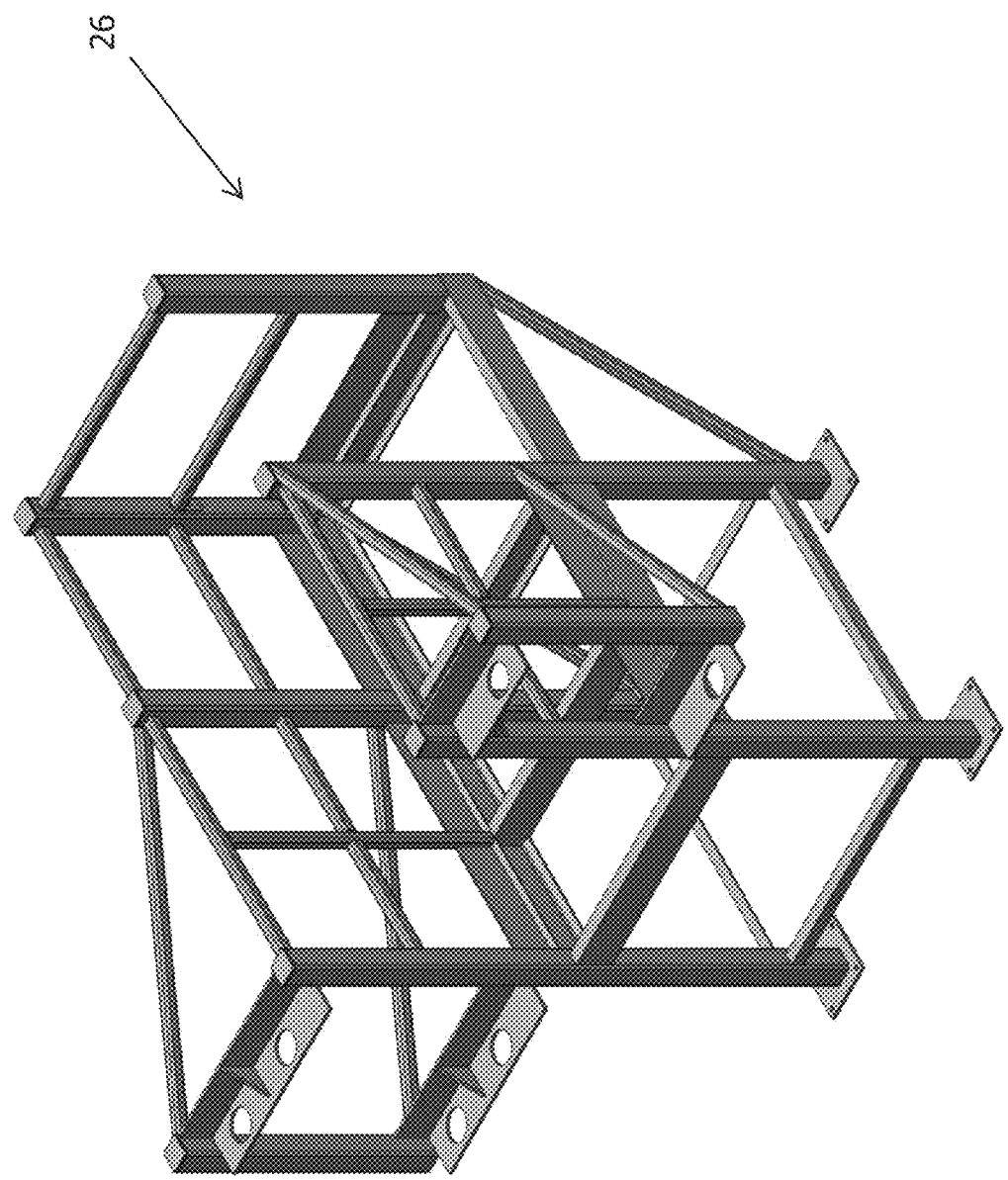
FIG. 37 is a perspective view of the rail tower top.
Figure 39:
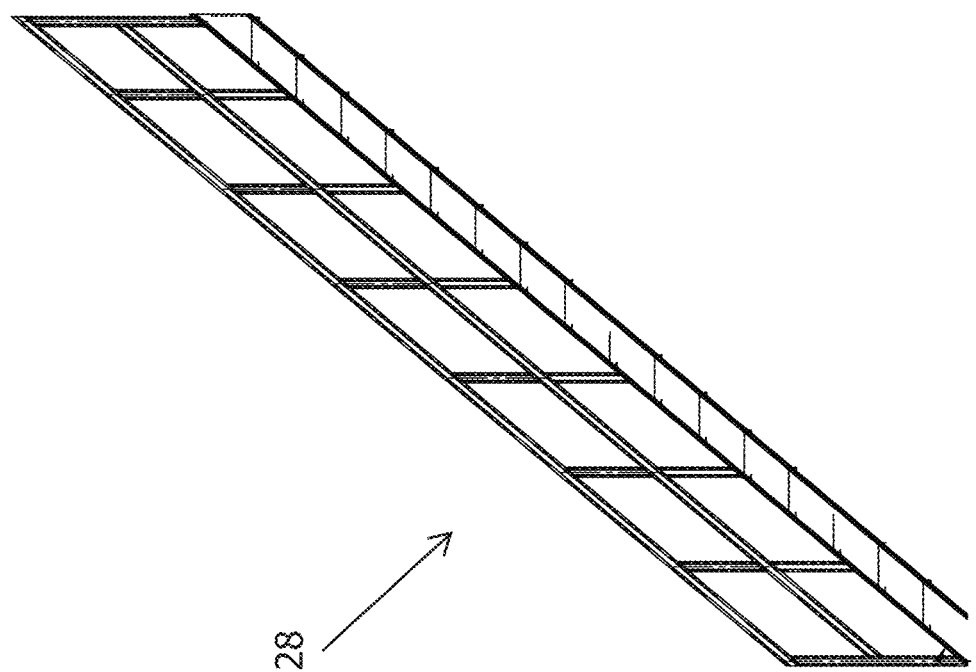
FIG. 39 is a side view of the rail tower stairs.
Figure 38:
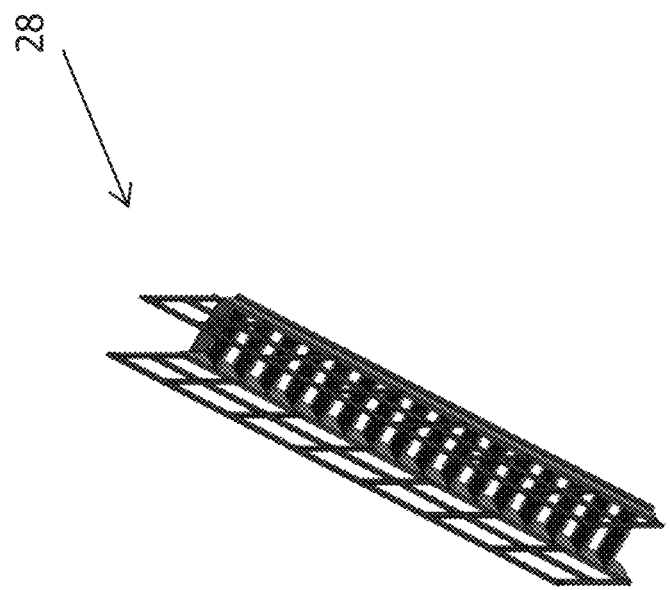
FIG. 38 is a perspective view of the rail tower stairs.
Figure 42:
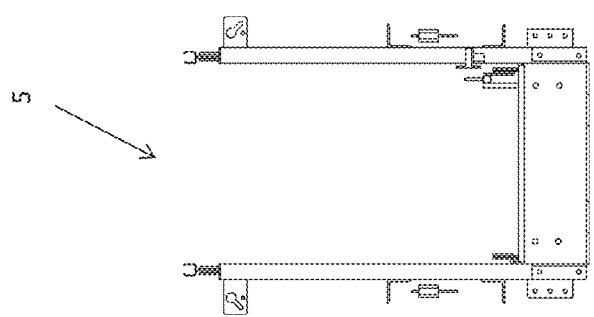
FIG. 42 is a front view of the gangway assembly.
Figure 41:
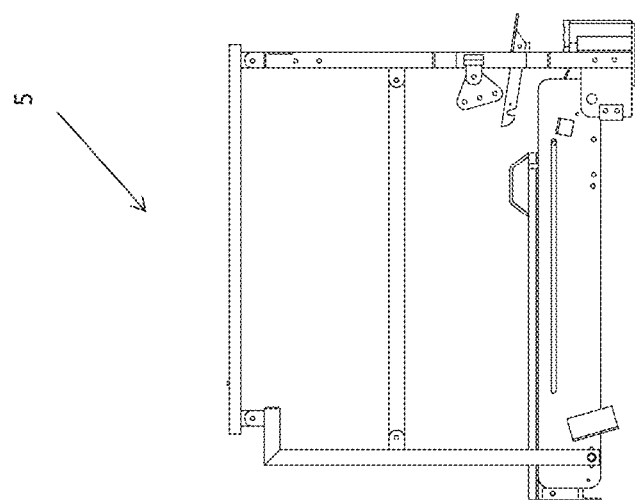
FIG. 41 is a side view of the gangway assembly.
Figure 40:
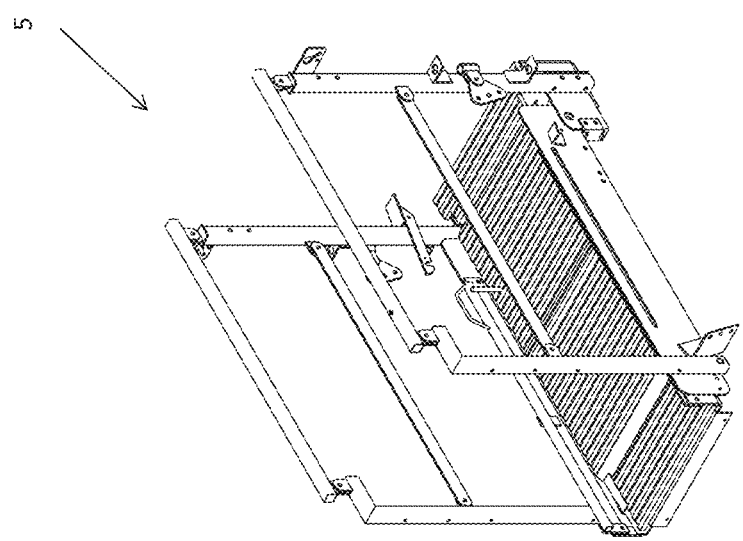
FIG. 40 is a perspective view of the gangway assembly.
Figure 49:
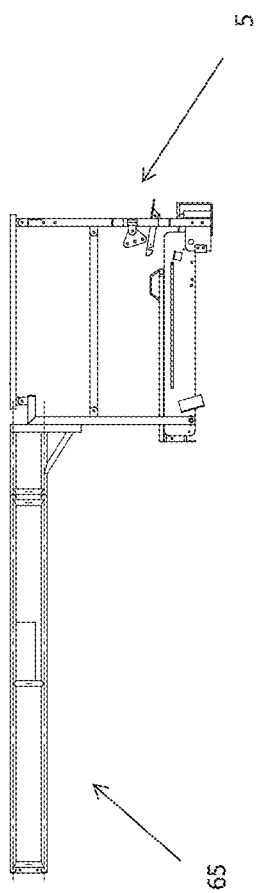
FIG. 49 is a side view of the rail car safety cage with the gangway assembly in the horizontal position.
Figure 50:
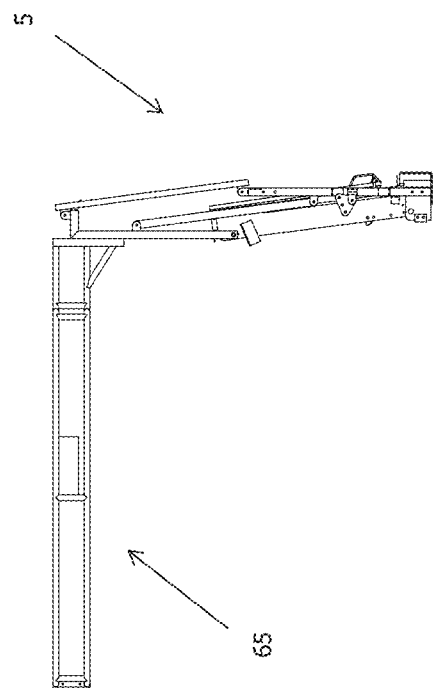
FIG. 50 is a side view of the rail car safety cage with the gangway assembly in the stored position.
Figure 48:
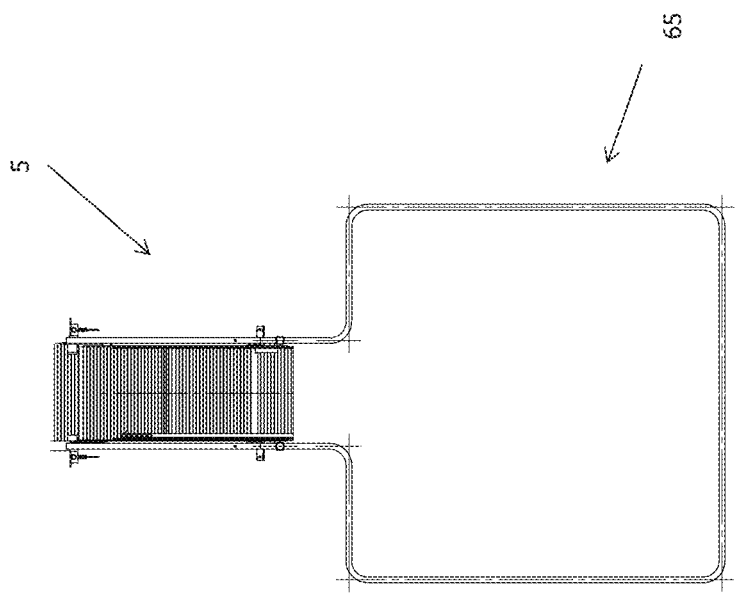
FIG. 48 is an overhead view of the rail car safety cage.
Figure 52:
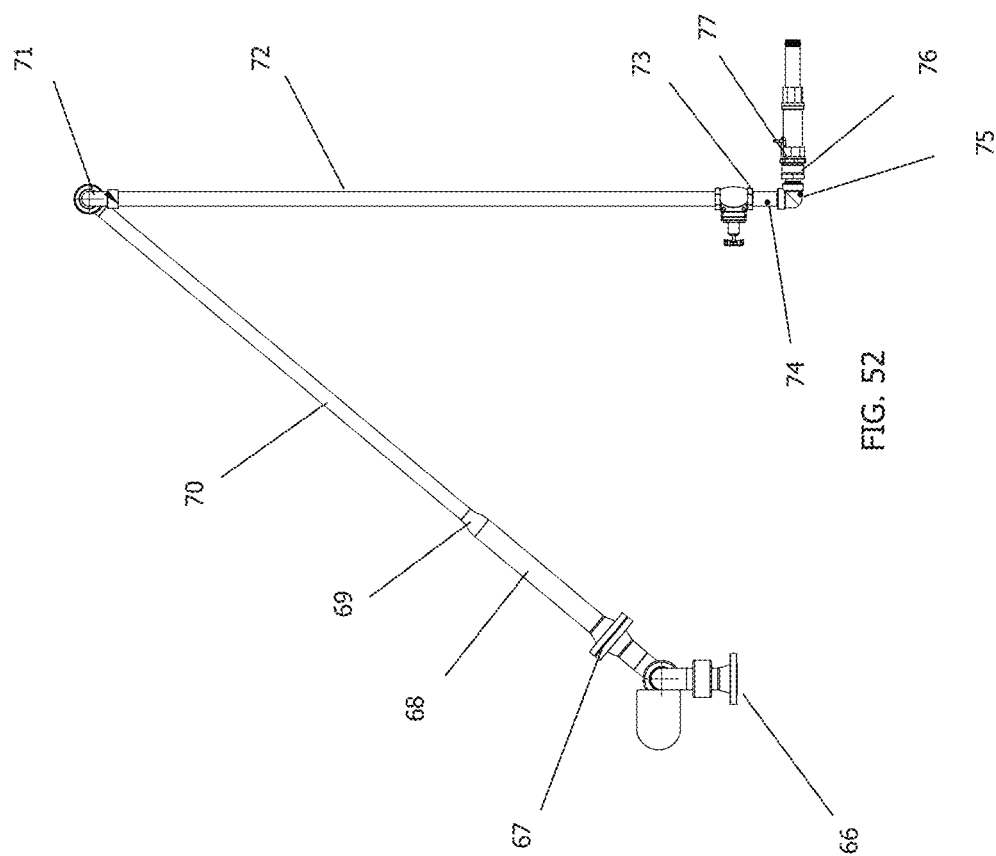
FIG. 52 is a side view of the loading arm.
Figure 51:
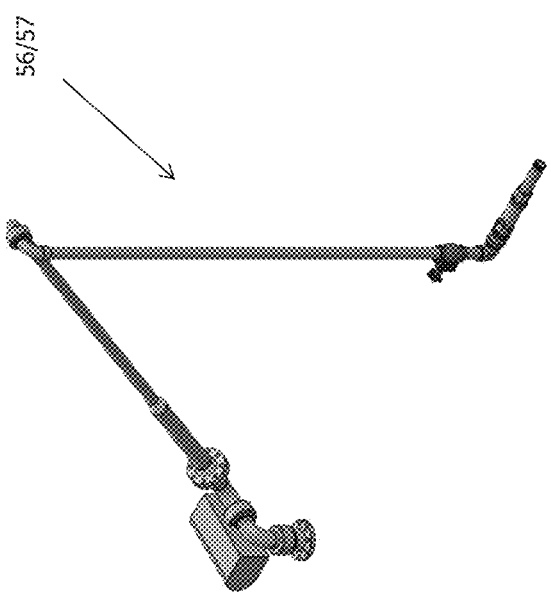
FIG. 51 is a perspective view of the loading arm.
Figure 54:
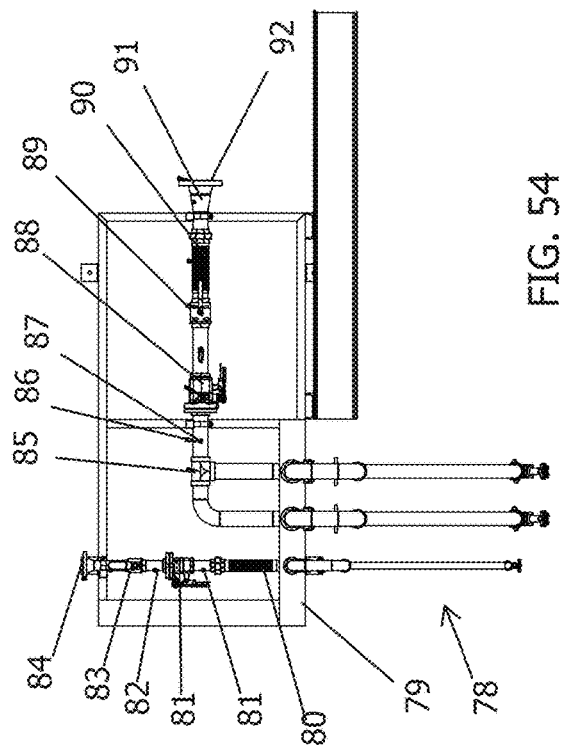
FIG. 54 is an overhead view of the bulkhead skid.
Figure 53:
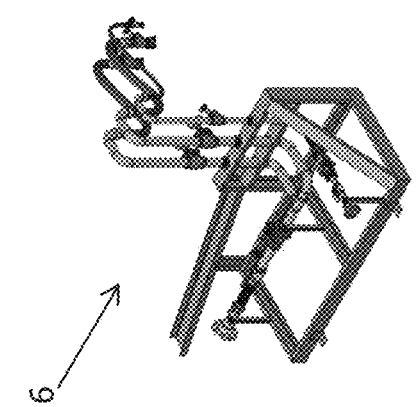
FIG. 53 is a perspective view of the bulkhead skid.
Figure 56:
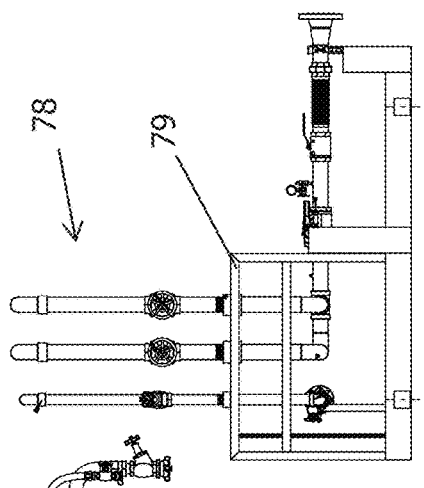
FIG. 56 is a back view of the bulkhead skid.
Figure 55:
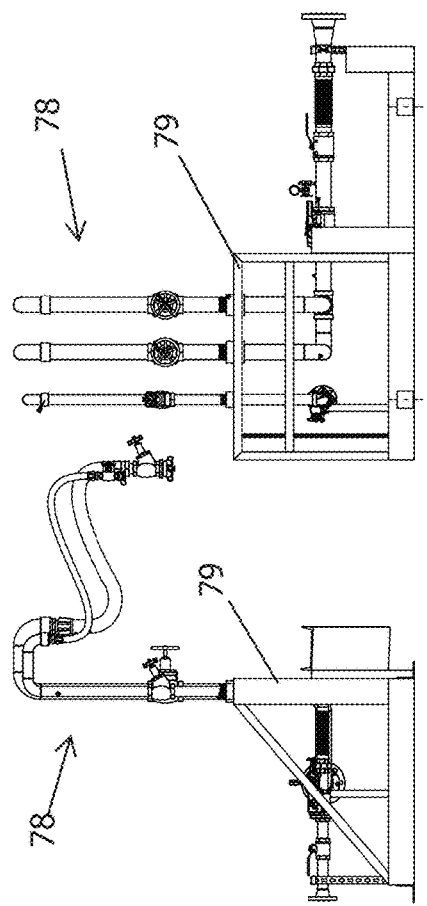
FIG. 55 is a side view of the bulkhead skid.
Figure 57:
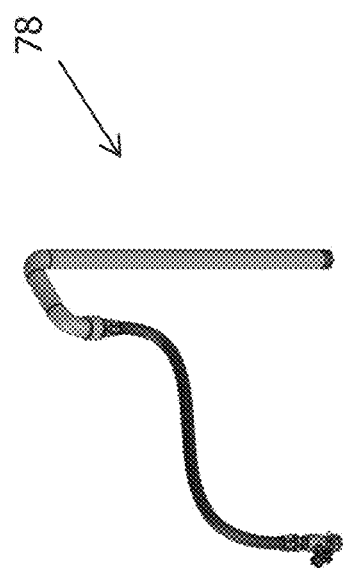
FIG. 57 is a perspective view of the small hose hook.
Figure 58:
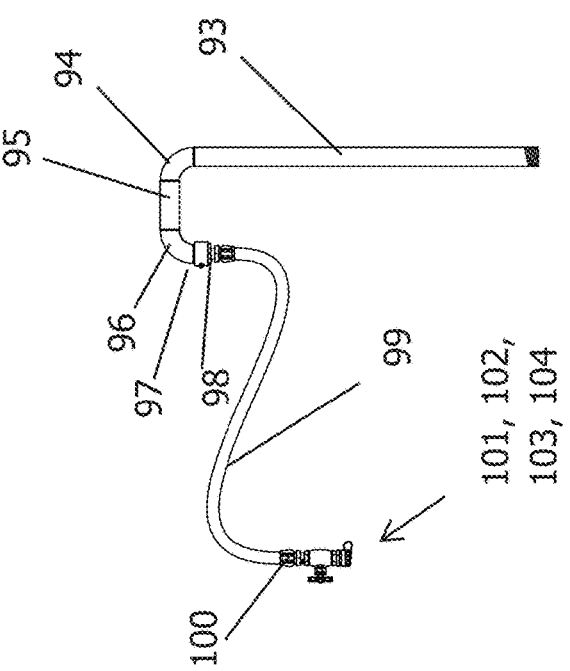
FIG. 58 is a side view of the small hose hook.
Figure 59:
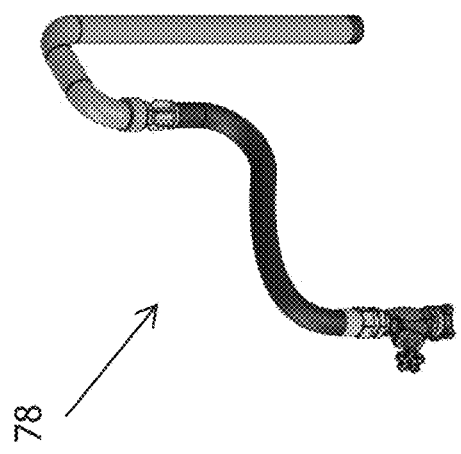
FIG. 59 is a perspective view of the large hose hook.
Figure 60:
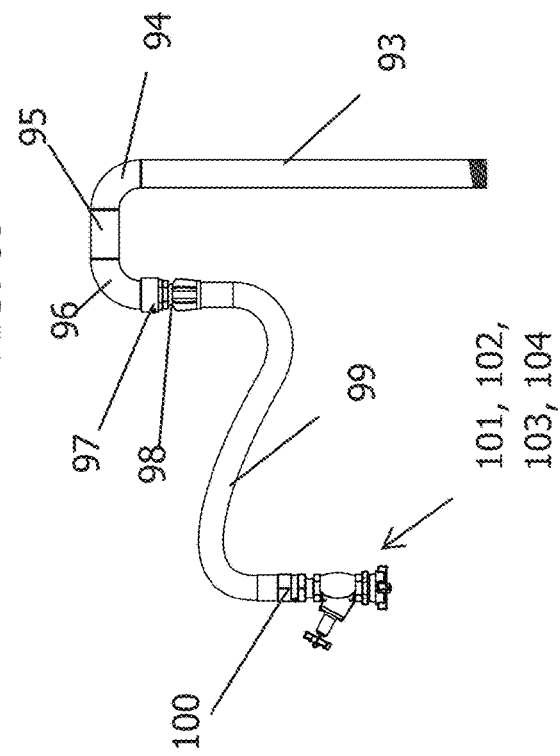
FIG. 60 is a side view of the large hose hook.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a natural gas liquid modular terminal. The terminal design may be focused on the storage and transfer of NGLs, specifically propane in the initial application, using an interconnected large high pressure pipe temporary storage interface. The use of an interconnected pipe temporary storage system may allow for more efficient use of space, which may be important given the limited footprint of the terminal. The interconnected pipes may be two or more pipes of any configuration. By way of example but not limitation, the two interconnected pipes may be configured with one pipe located above the other.

The terminal design may feature a proprietary modular manufacturing pipe interface for vapor recovery and high-capacity liquid transfer. This interface may be designed to aid in transferring of NGLs by providing a way to recover excess vapor volume that may be unrecoverable in a railcar during the transfer process. This is an important safety feature, as liquified propane gas vapor is highly flammable and can pose a significant risk if not handled properly. Railcars may be fully emptied once released back to the railroad. This may also be economically advantageous for the purchaser of the railcar product.

The modular manufacturing aspect of the pipe interface may allow for more efficient assembly and disassembly of the system, which may be useful for maintenance, redeployment of the asset, and upgrades.

In terms of overall terminal design, there are several other important factors to consider beyond just the temporary storage and transfer of NGLs. For example, safety is a critical concern, as NGLs can be dangerous if not handled properly. The terminal may be designed with all appropriate safety measures utilized today in a standard NGL distribution system. Further, without the need for large storage tank fields there is less volume at risk should an emergency situation arise. Environmental impact is another important consideration. NGLs are fossil fuels and can contribute to greenhouse gas emissions, so this terminal design may limit the environmental footprint needed for NGL distribution with measures in place to minimize emissions. Further, since the terminal can be placed in advantageous rail sites across North America, the terminal design could aid in the use of low-emission vehicles for transport and energy-efficient lighting and heating systems in the surrounding marketplaces where deployed.

Finally, the terminal design takes into account the logistical requirements of the NGL wholesale transfer process. This could include factors such as access to transportation infrastructure, proximity to potential customers, and the availability of skilled labor in the area.

Specifically, as shown in the drawings, the NGL modular terminal 1 may be constructed of a variety of modular components. Which components are used and in what configuration may depend on the particular site and its needs. Typically, the NGL modular terminal 1 may be located running along side railroad tracks 2. In most cases, the NGL modular terminal 1 may comprise interconnected pipes such as a lower pipe 3 and an upper pipe 4. The two pipes 3 and 4 may be interconnected, with the upper pipe 4 located above and running parallel to the lower pipe 3. The pipes 3 and 4 may each be a unitary pipe or may actually be a plurality of pipe segments of any desired length, joined together by any desired attachment device or devices.

One or more gangways 5 may be spaced periodically along the length of the pipes 3 and 4. Other components may include one or more bulkheads 6, miser compressors 7, and pump skids 8. In addition, a motor control center building 9 and/or a truck scale 10 may be located alongside the pipes 3 and 4.

The lower pipe 3 may be supported periodically by a plurality of saddles 11, each mounted atop a skid plate 12 on a foundation 13. The upper pipe 4 may be supported periodically by a plurality of double saddles 14. The double saddles 14 may be located between the lower pipe 3 and the upper pipe 4, such that the double saddles 14 rest atop the lower pipe 3 and the upper pipe 4 rests atop the double saddles 14. The double saddles 14 may correspond to and align with the saddles 11, such that one double saddle 14 is located above each of the saddles 11, if desired.

One or more rail tower bases 15 may be spaced periodically along the length of the pipes 3 and 4. Each rail tower base 15 may rest atop a foundation 16. A transportation/support bracket 17 may be located atop one or more of the rail tower bases 15.

A plurality of relief valves 18 may be located periodically along the top of the upper pipe 4. A plurality of connection pipes 19 may be located periodically along the length of the pipes 3 and 4 and may be in fluid communication with both the lower pipe 3 and the upper pipe 4, such that pipes 3 and 4 may be in fluid communication with each other via the connection pipes 19. The pipes 3 and 4 may each terminate on either end in a pipe cap 145 or blind flange 25, as desired. Sections of the pipes 3 and 4 may be joined together via connection fittings 21. Spares 22 may be located as desired in the tops and/or sides of the pipes 3 and 4.

A plurality of vapor lines 23 may run parallel to the pipes 3 and 4. For example, as shown, two vapor lines 23 may run parallel to the upper pipe 4 to the side of the upper pipe 4 closes to the tracks 2. Specifically, the vapor lines 23 may comprise a vapor header railcar/compressor and a vapor header compressor/diffuser. The vapor lines 23 may be supported by a plurality of pipe supports 24 extending perpendicularly outward from pipe 3, pipe 4, the saddles 11, the double saddles 14, the rail tower bases 15, and/or any other desired element of the NGL modular terminal 1. The vapor lines 23 may each terminate on either end with a blind flange 25 or may connect, as necessary, to the diffuser 142.

A rail tower top 26 may be mounted atop one or more of the rail tower bases 15. Gangways 5 may extend outward from the rail tower tops 26. Boom arms 27 may likewise be supported by the rail tower tops 26. The rail tower top 26 may be accessible via stairs 28 extending upward from a stair landing 29. A tie-in 30 may connect one of the vapor lines 23 to a bulkhead 6. A vapor header compressor/diffuser tie-in 31 may connect one of the vapor lines 23 to the diffuser 142.

In one embodiment, as illustrated in FIGS. 79 through 92, a single vapor line 23 may terminate adjacent to a first gangway 5, where a tie-in 30 connects to the vapor line 23. The single vapor line 23 may extend along the length of the two pipes 3 and 4, past a second gangway 5. Before reaching a third gangway 5, a second vapor line 23 may tie in to the first vapor line 23. A ball valve on the first vapor line 23 may be positioned adjacent to the tie in. The two vapor lines 23 may run parallel down the remaining length of the two pipes 3 and 4. At any point beyond the last gangway 5 the first vapor line 23 may terminate at a blind flange 25. The second vapor line 23 may then tie in to the diffuser 142.

The diffuser 142 may be one or more pipes parallel to and inside of the lower pipe 3. The diffuser 142 may connect to one or more vapor lines 23 by a vapor header compressor/diffuser tie-in 31. A diffuser tie-in valve 143 may be modulated to regulate the flow of vapor to the diffuser 142. The diffuser 142 may comprise a diameter smaller than the diameter of the lower pipe 3. The diffuser 142 may extend either partially or completely through the length of the lower pipe 3.

The diffuser 142 may be submerged partially or completely in NGL within the lower pipe 3. A plurality of holes in the diffuser 142 may be spaced along the diffuser 142. As vapor enters the diffuser 142, the vapor may bubble from the holes in the diffuser 142 through the NGL, cooling and condensing some or all of the vapor into the NGL. This condensed vapor may be recovered along with the NGL. The remaining vapor may be recovered from either the lower pipe 3 or upper pipe 4 as necessary.

Figure 74:
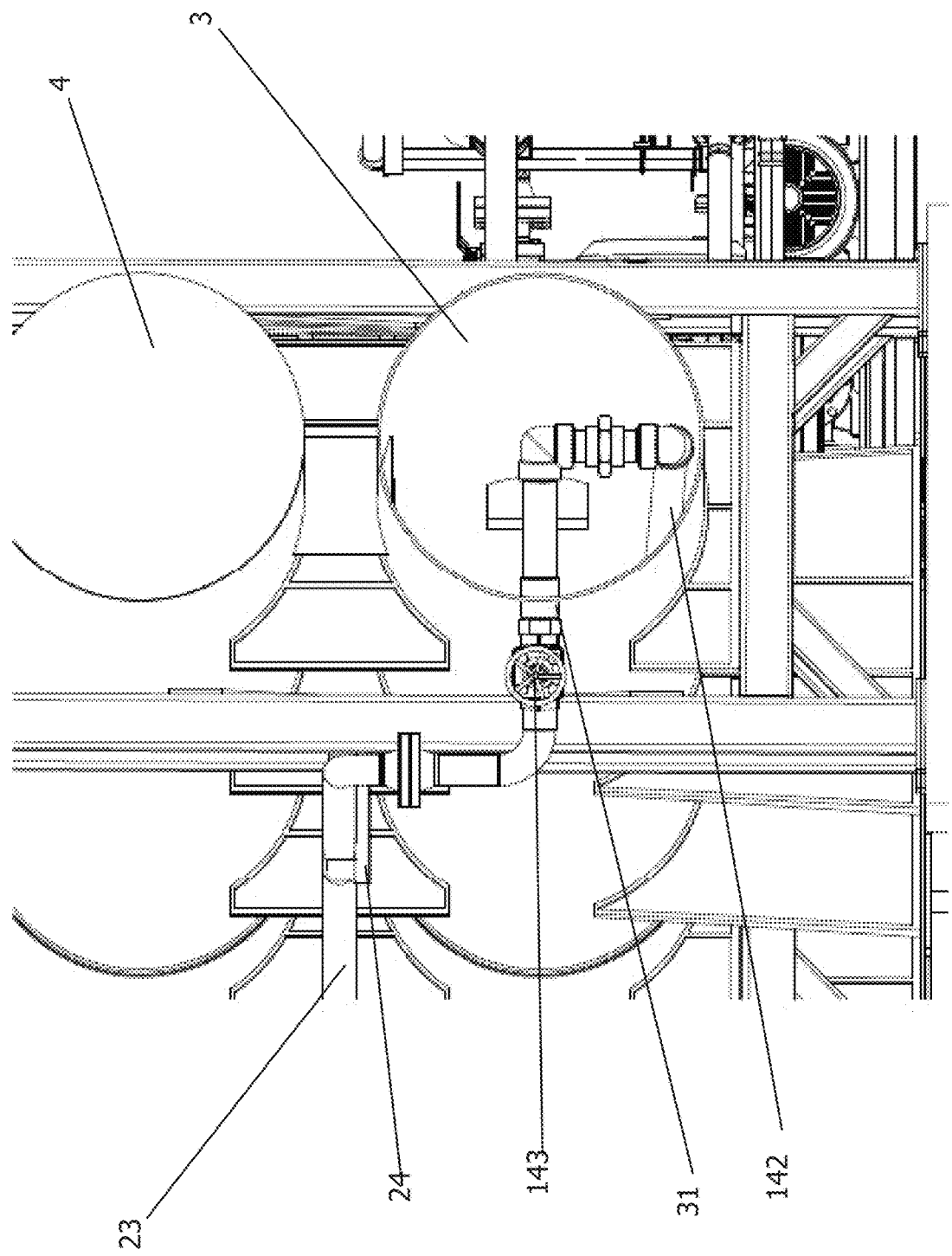
FIG. 74 is a view of the diffuser connection and diffuser inside of the lower pipe.
Figure 75:
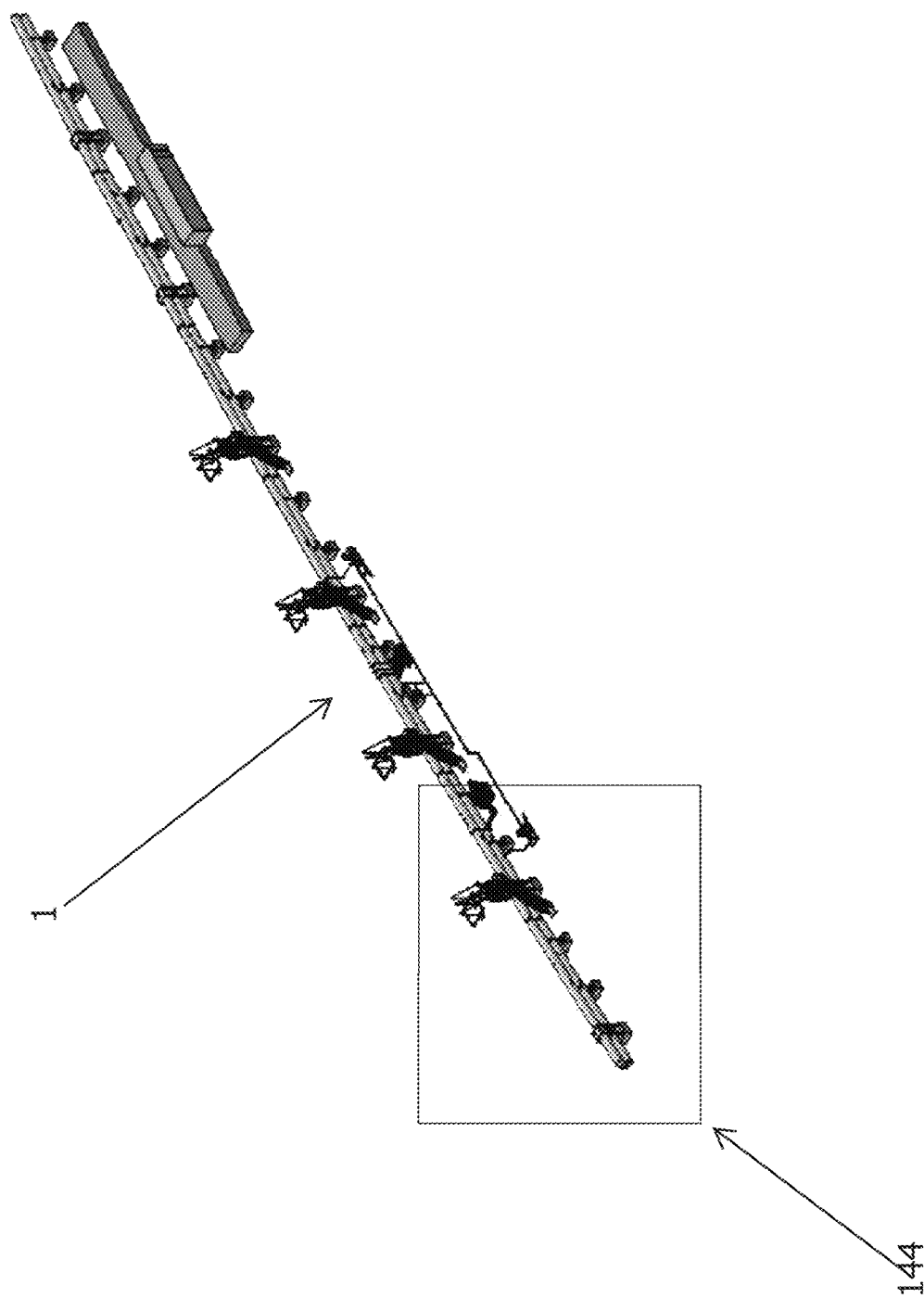
FIG. 75 is a top perspective view of the natural gas liquid modular terminal with the diffuser location identified.
Figures 79, 80:
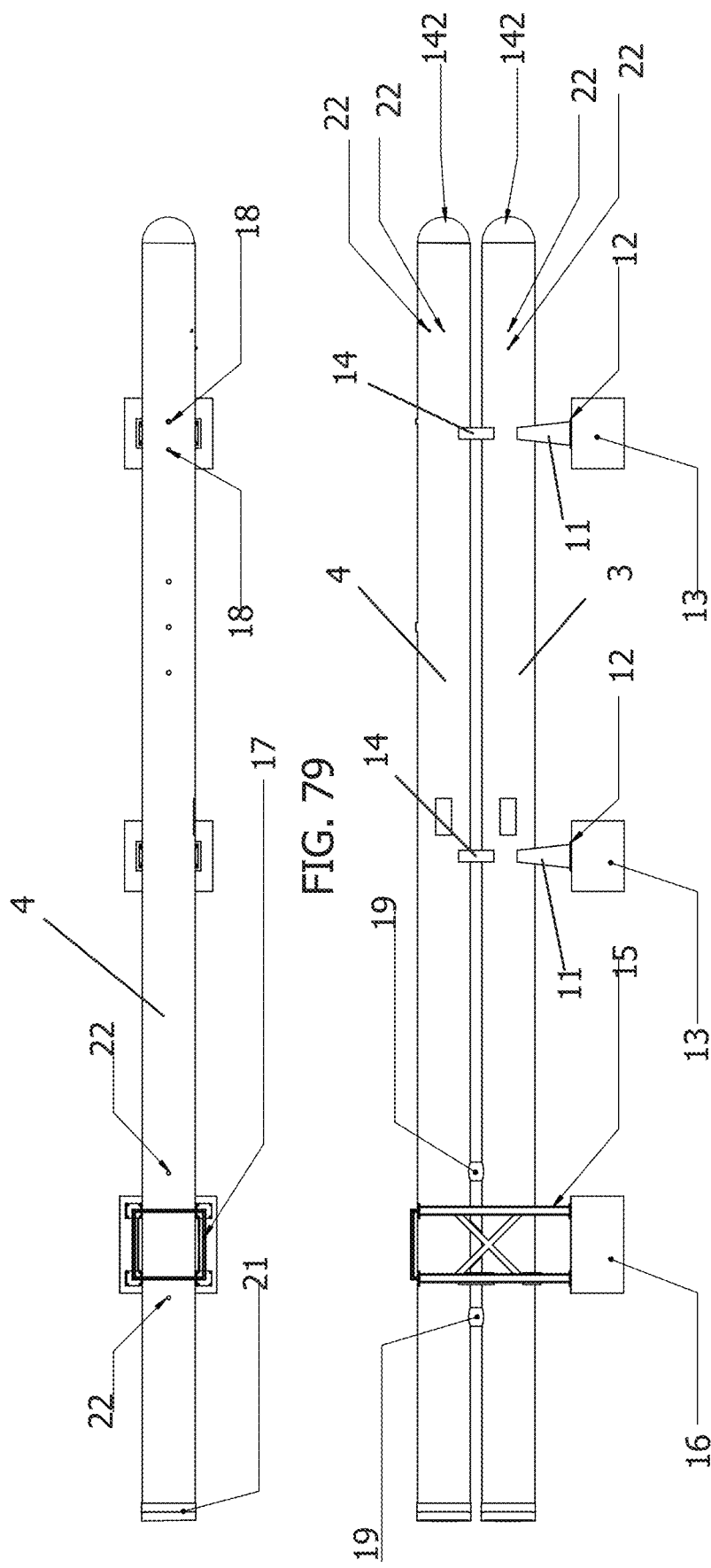
FIG. 79 is a top view of a second embodiment of a first section of the natural gas liquid modular terminal.
FIG. 80 is a side view of the second embodiment of the first section of the natural gas liquid modular terminal.
Figure 83:
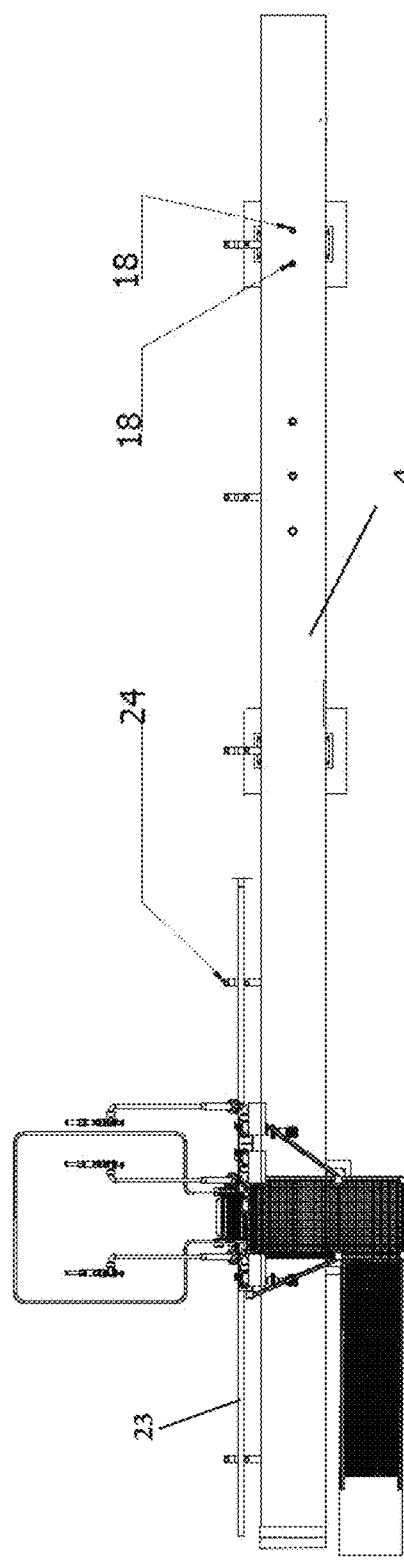
FIG. 83 is a top view of a second embodiment of a third section of the natural gas liquid modular terminal.
Figure 84:
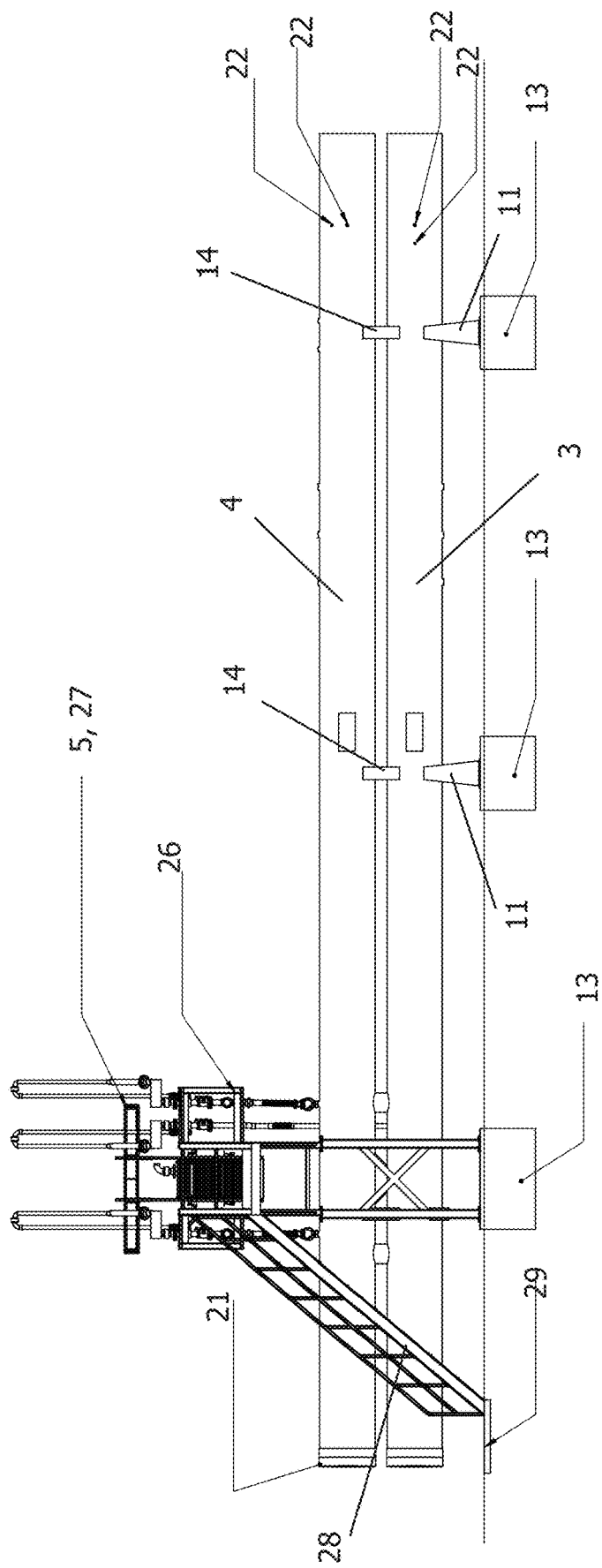
FIG. 84 is a side view of the second embodiment of the third section of the natural gas liquid modular terminal.
Figure 85:
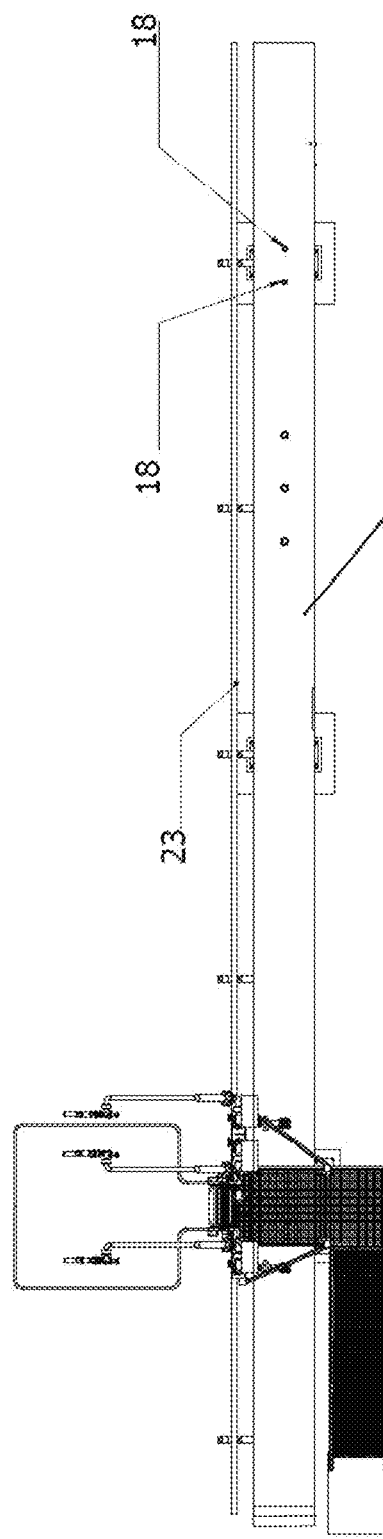
FIG. 85 is a top view of a second embodiment of a fourth section of the natural gas liquid modular terminal.
Figure 86:
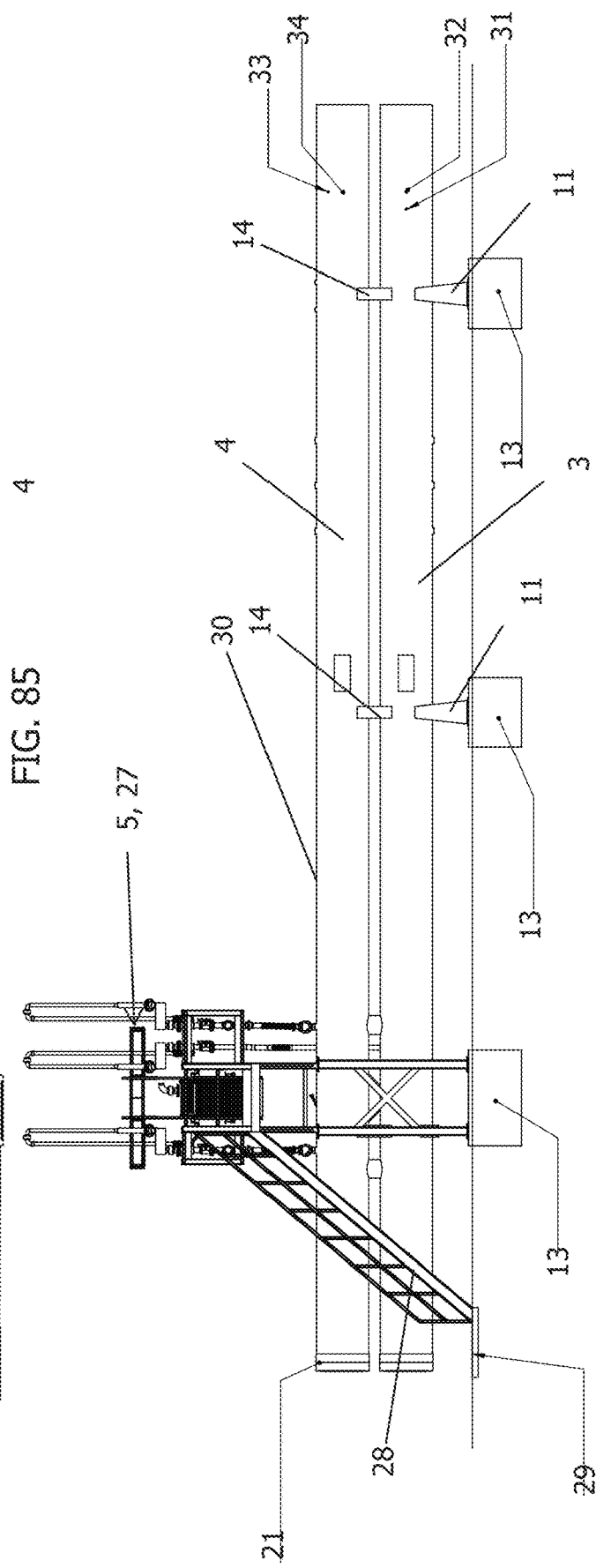
FIG. 86 is a side view of the second embodiment of the fourth section of the natural gas liquid modular terminal.
Figure 87:
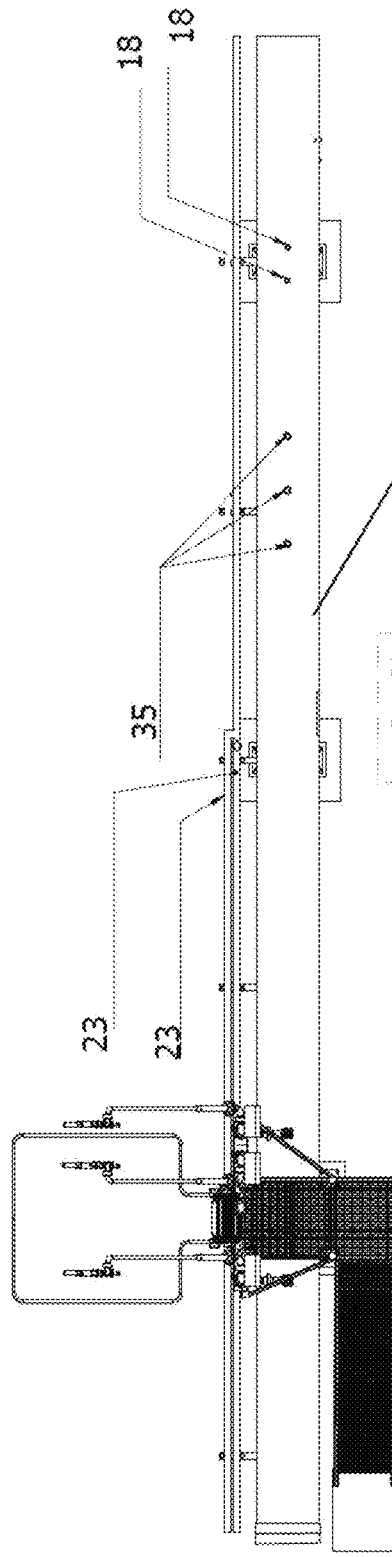
FIG. 87 is a top view of a second embodiment of a fifth section of the natural gas liquid modular terminal.
Figure 88:
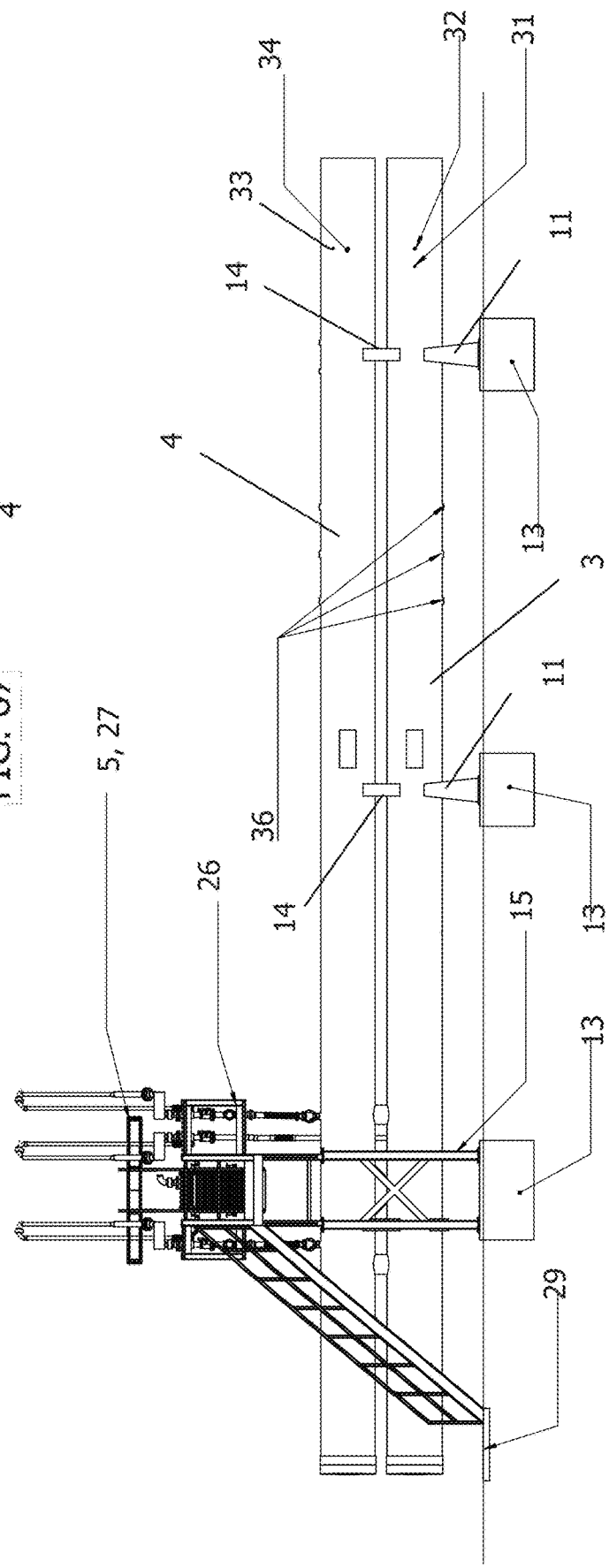
FIG. 88 is a side view of the second embodiment of the fifth section of the natural gas liquid modular terminal.
Figure 89:
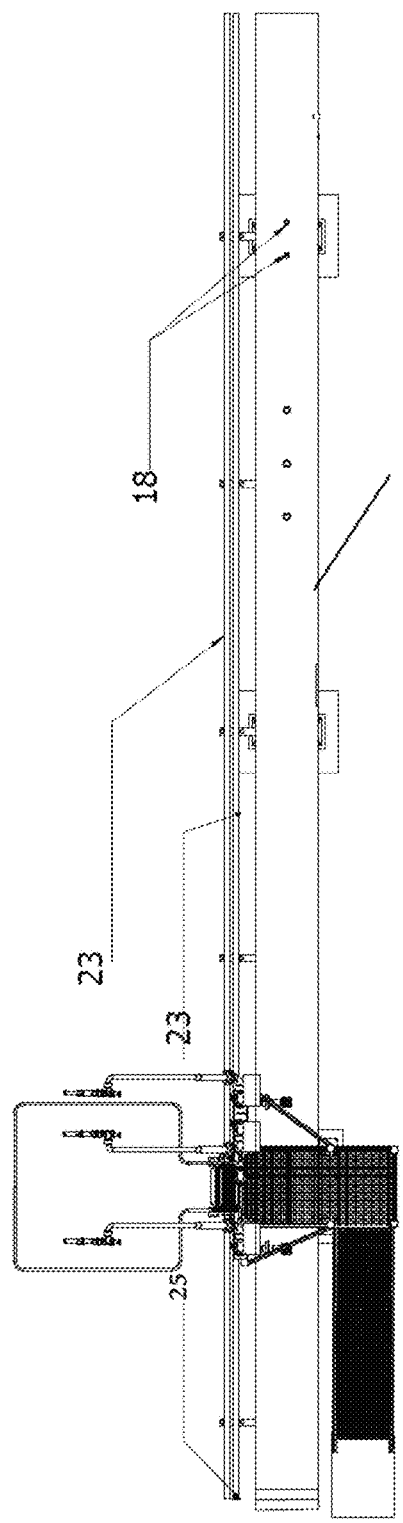
FIG. 89 is a top view of a second embodiment of a sixth section of the natural gas liquid modular terminal.
Figure 90:
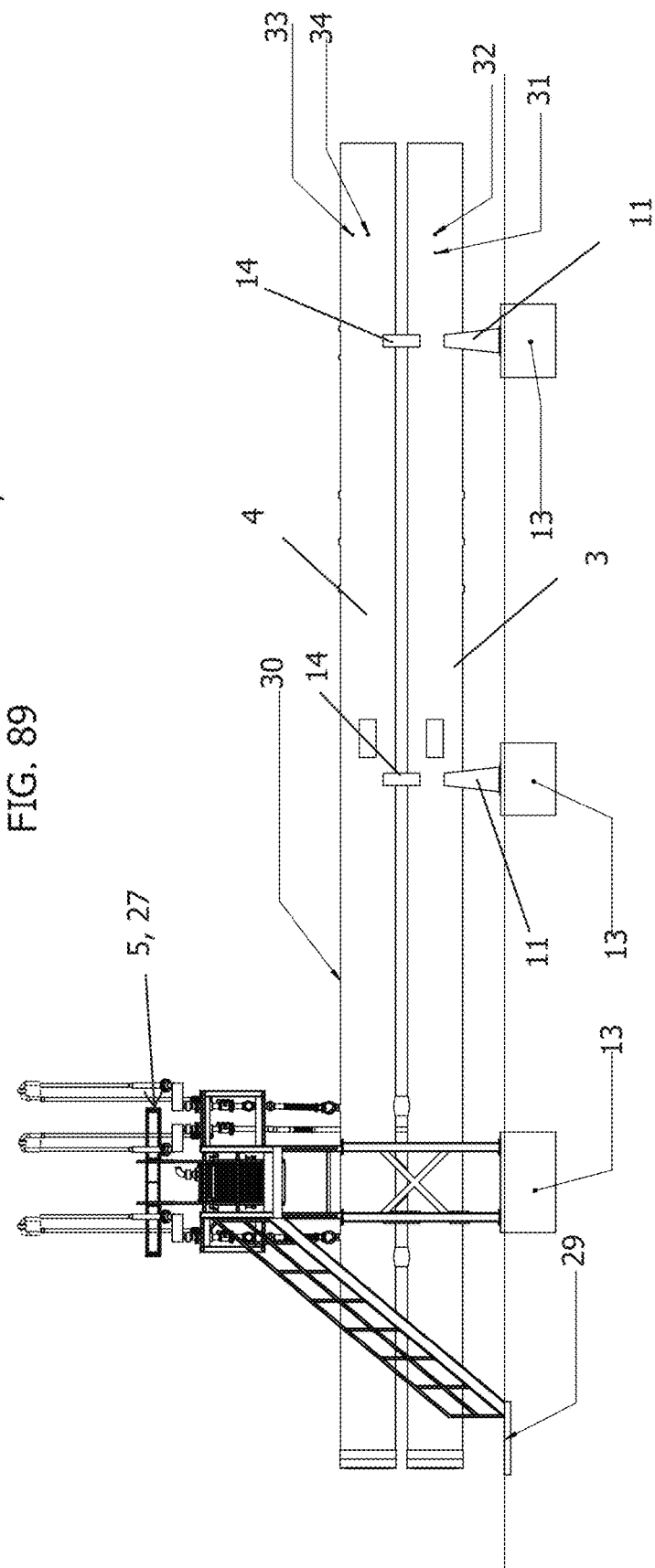
FIG. 90 is a side view of the second embodiment of the sixth section of the natural gas liquid modular terminal.
Figure 91:
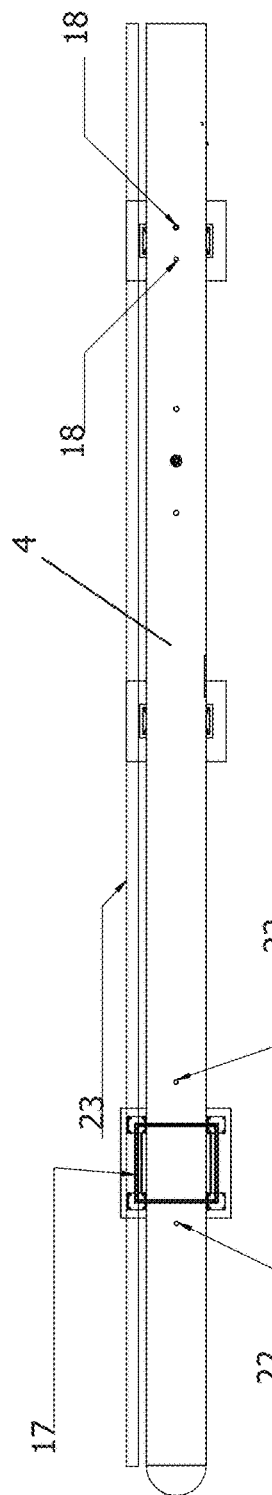
FIG. 91 is a top view of a second embodiment of a seventh section of the natural gas liquid modular terminal.
Figure 92:
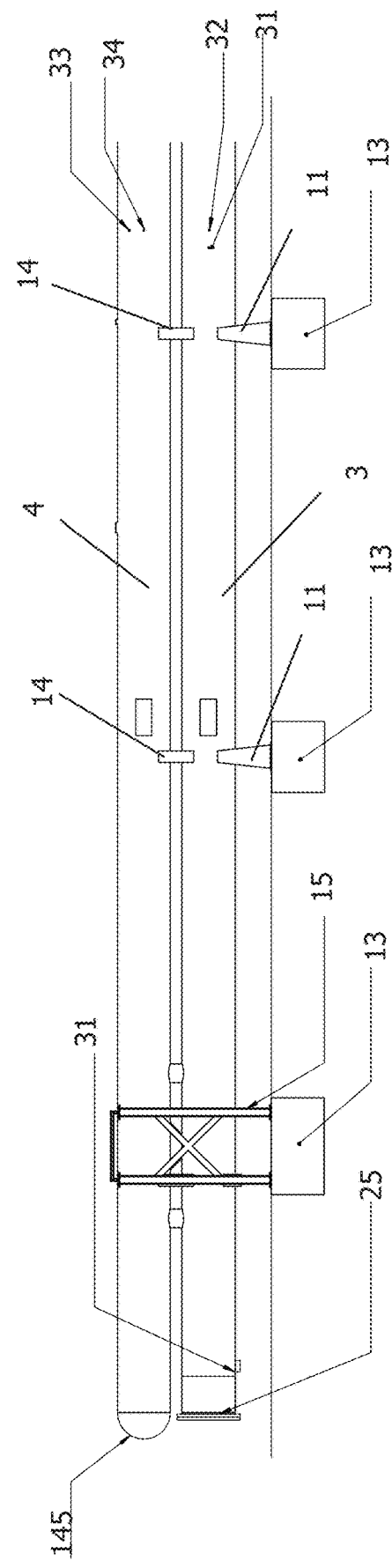
FIG. 92 is a side view of the second embodiment of the seventh section of the natural gas liquid modular terminal.

By way of example but not limitation, the diffuser 142 may be approximately 120 ft. in length. The diffuser 142 may comprise three 40 ft. sections. The three sections may be Schedule 40 pipe. The first section may comprise 40 ft. of 3-inch diameter pipe with ⅜-inch holes drilled in the top of the pipe every 13 inches. The second section may reduce down to 2-inch diameter pipe with ⅜-inch holes drilled in the top of the pipe at every 17 inches. Finally, the third section may reduce down to 1¼-inch pipe with ⅜-inch holes drilled in the top of the pipe at every 40-inches. The diffuser 142 may terminate with a cap comprising a ½-inch hole drilled in the center of the cap. Casing spacers may be placed every 20-ft. along the diffuser 142 to keep the diffuser 142 off of the bottom of the lower pipe 3. The diffuser 142 may be at a located 144 along NGL modular terminal 1 as shown in FIG. 74.

A thermowell access port 31 and a liquid level access port 32 may be located in the side of the lower pipe 3, while a pressure access port 33 and a liquid level access port 34 may be located in the side of the upper pipe 4. A plurality of pump bypass tie-ins 35 may be located in the top of the upper pipe 4, while a plurality of pump liquid out tie-ins 36 may be located in the bottom of the lower pipe 3.

The saddles 11 may each be a single saddle as shown in FIG. 18 through 20, an A-frame saddle as shown in FIGS. 25 through 28, or any other desired style of saddle, as appropriate. The saddles 11 may be made of steel or any other desired material. The saddles 11 may be mounted atop the skid plates 12 on foundations 13, with the lower pipe 4 resting atop the saddles 11.

If one or more of the saddles 11 are single saddles, they may comprise an arched upper surface 37, where the arched upper surface 37 defines an upward-facing circular arc sufficiently sized to correspond to the lower pipe 3, a flat bottom surface 38, and a body 39 connecting the upper surface 37 and the bottom surface 38. The body 39 may span the width of the saddle 11 and may have a front face 40, an opposing back face 41, and a plurality of vertical ribs 42 projecting perpendicularly from the front face 40 and/or the back face 41, where at least a portion of the vertical ribs 42 extend from the arched upper surface 37 to the flat bottom surface 38, providing structure and reinforcement to the saddle 11. The A-frame saddle may have the same components, but may be taller, with a larger distance from the upper surface 37 to the bottom surface 38, and the bottom surface 38 may be both wider and deeper than the upper surface 37 such that the sides 43 of the saddle 11 and the vertical ribs 42 angle inward as they extend upward.

The plurality of double saddles 14 may be located between the lower pipe 3 and the upper pipe 4, such that the double saddles 14 rest atop the lower pipe 3 and the upper pipe 4 rests atop the double saddles 14. Each of the double saddles 14 may comprise an arched lower surface 44, where the lower surface 44 defines a downward-facing circular arc sufficiently sized to correspond to the lower pipe 3; an arched upper surface 45, where the upper surface 45 defines an upward-facing circular arc sufficiently sized to correspond to the upper pipe 4; and a body 46 connecting the lower surface 44 and the upper surface 45. The body 46 may span the width of the double saddle 14 and may have a font face 47, an opposing back face 48, and a plurality of vertical ribs 49 projecting perpendicularly from the front face 47 and/or the back face 48, where at least a portion of the vertical ribs 49 extend from the arched lower surface 44 to the arched upper surface 45, providing structure and reinforcement to the double saddle 14.

The rail tower base 15 may be comprised of four vertical legs 50 spaced in a rectangular configuration. Each of the legs 50 may be made of square steel tubing, or any other desired material. On each of the long sides of the rectangle, a lower horizontal cross member 51 may extend between two of the legs 50 and may be supported by an angled support 52 on each end. On each of the short sides of the rectangle, the two legs 50 may be connected by an X-shaped support 53. A plate 54 may be located on each end of each of the legs 50.

Each rail tower top 26 may support a gangway 5, which may be surrounded by railing 55, which may be detachable. Each rail tower top 26 may likewise support one or more liquid loading arms 56 and one or more vapor loading arms 57. Each may feature an emergency shutdown valve 58. The liquid loading arms 56 may connect to and be in fluid communication with the upper pipe 4 via a liquid site flow valve 59, flex loops 60, and one or more valve assemblies 61. For example, each valve assembly 61 may include a backcheck 62 and an angled globe valve 63, as shown, or any other desired components. The vapor loading arms 57 may connect to and be in fluid communication with the vapor line 23 that connects the railcar to the compressor 7 via a flex hose 64. The loading arms 56 and 57 may be at least partially surrounded by a safety cage 65.

Each of the load arms 56 and 57 may comprise consecutively, a loading swivel arm 66; a neck flange 67; a pipe 68; a reducer 69; a second pipe 70; a half coupling with MTR 71; a hose 72; a valve 73, which may be a globe valve; a nipple 74; an elbow 75; a hose cup 76, and a rail car attachment 77.

Each bulkhead 6 may comprise a plurality of hose hooks 78 mounted on a frame 79. In particular, as shown, the bulkhead 6 may comprise three hose hooks 78. One hose hook 78 may be smaller than the other two and may connect to an assembly comprising, consecutively, a flex with union 80, a nipple 81, an emergency shutdown valve 82, another nipple 81, a ball valve 83, another nipple 81, and a neck flange 84. The two larger hose hooks 78 may join together via a tee 85 and connect to an assembly comprising, consecutively, a threadolet 86, a hydrostatic relief valve 87, an emergency shutdown valve 88, a ball valve 89, a flex with union 90, a reducer 91, and a flange 92. The hose hooks 78 themselves may comprise, consecutively, a pipe 93, an elbow 94, a pipe 95, an elbow 96, a coupling 97, a bushing 98, a hose 99, a globe valve 100, and either a MPT 101 and a plug 102 or a cap 103 with an adaptor 104.

Each compressor 7 may connect to three lines: two vapor header lines 105 and a vapor diffuser line 106. The compressor 7 may connect to the three lines via an assembly comprising, consecutively: two flex 107; two flanges 108; two 3-way valves 109; two nipples 110; a tee 111 and nipple 112 connecting to the vapor diffuser line 106; and a nipple 113 and threaded union 114 connecting to each of the vapor header lines 105.

Each pump skid 8 may comprise three pumps 115 connected to a header pipe 116, which in turn connects to the bulkhead 6, Each pump 115 may comprise: an elbow 117; a nipple 118; a back check valve 119; a flanged flex hose 120; a ball valve 121; a flange 122; an elbow 123; a tee 124; a nipple 125; a bypass 126; a hydrostatic relief valve 127; a flex hose with union 128, which connects to the tank to return liquid from the pump 115 to the tank; a motor 129; a flange 130; a needle valve 131; a pump 132; a flange 133; a ball valve 134; and a flex hose 135, which connects to the tank to receive liquid from the tank to the pump 115.

The MCC building 9 may comprise an electrical room 136 and an office 137, and may feature a dividing wall 138 with a door 139 therebetween. The MCC building 9 may also have an exterior door 140 and a window 141.

The components of the NGL modular terminal 1 may be modular and thus may be capable of being manufactured offsite in a warehouse and assembled in situ on railroad property. The NGL modular terminal 1 may cost a fraction of the price of a comparable standard terminal, while taking up less land due to the interconnected pipes 3 and 4. The NGL modular terminal 1 may be suitable for use with any desired NGL, but particularly for use with propane.

Whereas, the devices and methods have been described in relation to the drawings and claims, it should be understood that other and further modifications, apart from those shown or suggested herein, may be made within the spirit and scope of this invention.

What is claimed is:

1. A natural gas liquid modular terminal comprising:
a lower pipe;
an upper pipe located above and running parallel to the lower pipe and where the upper pipe is in fluid communication with the lower pipe;
one or more bulkheads;
one or more compressors; and
one or more pumps,
where the lower pipe, upper pipe, bulkheads, compressors, and pumps are modular and capable of being assembled onsite according to the needs of a user; the natural gas liquid modular terminal further comprising:
one or more liquid loading arms in fluid communication with the upper pipe; and
one or more vapor loading arms in fluid communication with a vapor line that connects to the one or more compressors.

2. The natural gas liquid modular terminal of claim 1 further comprising one or more of the of the following:
   one or more rail towers;
   one or more gangways; and
   one or more stairways;
where the rail towers, gangways, and/or stairways are modular and capable of being assembled onsite according to the needs of the user.

3. The natural gas liquid modular terminal of claim 1 further comprising a pair of vapor lines.

4. The natural gas liquid modular terminal of claim 1 further comprising a safety cage at least partially surrounding the loading arms.

5. The natural gas liquid modular terminal of claim 1 further comprising:
   at least one vapor line; and
   at least one diffuser;
where the at least one vapor line is in fluid communication with the at least one diffuser.

6. A natural gas liquid modular terminal comprising:
   a lower pipe;
   an upper pipe located above and running parallel to the lower pipe and where the upper pipe is in fluid communication with the lower pipe;
   one or more bulkheads;
   one or more compressors; and
   one or more pumps,
where the lower pipe, upper pipe, bulkheads, compressors, and pumps are modular and capable of being assembled onsite according to the needs of a user; the natural gas liquid modular terminal further comprising:
   at least one vapor line; and
   at least one diffuser;
where the at least one vapor line is in fluid communication with the at least one diffuser and where the at least one diffuser comprises:
   a pipe with a cross-sectional diameter smaller than a cross-sectional diameter of the lower pipe; and
   a plurality of holes in the pipe spaced along a length of the pipe;
where the at least one diffuser is disposed within the lower pipe and extends parallel to the lower pipe.

7. The natural gas liquid modular terminal of claim 6 where the at least one diffuser is at least partially submerged in natural gas liquid.

8. The natural gas liquid modular terminal of claim 7 where the at least one diffuser is a length less than the length of the lower pipe.

9. The natural gas liquid modular terminal of claim 8 where the at least one diffuser further comprises a plurality of diffuser sections, where each diffuser section comprises a smaller cross-sectional diameter than a previous section.

10. The natural gas liquid modular terminal of claim 8 where the at least one diffuser comprises a cap on a terminal end of the at least one diffuser.

11. The natural gas liquid modular terminal of claim 10 where the cap comprises at least one hole extending entirely through the cap.

* * * * *